US012407136B2

(12) United States Patent
Suzuki et al.

(10) Patent No.: US 12,407,136 B2
(45) Date of Patent: Sep. 2, 2025

(54) CONNECTOR FOR HIGH-SPEED TRANSMISSION

(71) Applicant: YAMAICHI ELECTRONICS CO., LTD., Tokyo (JP)

(72) Inventors: Hayane Suzuki, Tokyo (JP); Yosuke Takai, Tokyo (JP); Toshiyasu Ito, Tokyo (JP)

(73) Assignee: YAMAICHI ELECTRONICS CO., LTD., Tokyo (JP)

( * ) Notice: Subject to any disclaimer, the term of this patent is extended or adjusted under 35 U.S.C. 154(b) by 412 days.

(21) Appl. No.: 17/976,332

(22) Filed: Oct. 28, 2022

(65) Prior Publication Data

US 2023/0134664 A1 May 4, 2023

(30) Foreign Application Priority Data

Nov. 2, 2021 (CN) ........................ 202111289444.8

(51) Int. Cl.

| | |
|---|---|
| ***H01R 13/6471*** | (2011.01) |
| ***H01R 12/72*** | (2011.01) |
| ***H01R 13/40*** | (2006.01) |
| ***H01R 13/514*** | (2006.01) |
| ***H01R 43/16*** | (2006.01) |

(52) U.S. Cl.

CPC ....... *H01R 13/6471* (2013.01); *H01R 12/724* (2013.01); *H01R 13/40* (2013.01); *H01R 13/514* (2013.01); *H01R 43/16* (2013.01)

(58) Field of Classification Search

CPC .. H01R 12/6471; H01R 12/40; H01R 12/514; H01R 12/724; H01R 43/16

USPC .......................................................... 439/108

See application file for complete search history.

(56) References Cited

U.S. PATENT DOCUMENTS

| | | | | |
|---|---|---|---|---|
| 8,545,240 B2 * | 10/2013 | Casher | H01R 13/6474 | 439/108 |
| 9,692,183 B2 * | 6/2017 | Phillips | H01R 13/6471 | |
| 2009/0221165 A1 * | 9/2009 | Buck | H01R 13/6471 | 439/108 |
| 2011/0189895 A1 * | 8/2011 | Ito | H01R 24/38 | 439/629 |

(Continued)

FOREIGN PATENT DOCUMENTS

| | | | | |
|---|---|---|---|---|
| CN | 1268040 C * | 8/2006 | H01R 12/724 |
| JP | 2012508958 A | 4/2012 | |

(Continued)

*Primary Examiner* — Peter G Leigh

(74) *Attorney, Agent, or Firm* — Hayes Soloway P.C.

(57) ABSTRACT

A connector for high-speed transmission includes a housing, a column of contacts and a metal member in the contacts. The housing includes an opening portion to be fitted into an external communication partner. The contact has a contact portion in contact with the communication partner, a first linear portion extending rearward from a rear end of the contact portion, a second linear portion bent and extending from a rear end of the first linear portion and a terminal portion soldered to an external substrate. The metal member shorts the contact for ground and is bent so as to avoid contacts other than the contact for ground. The metal member has a bent portion bent in a U-shape across the contacts other than the contact for ground, and is connected to the first and/or the second linear portion of the contact for ground.

8 Claims, 21 Drawing Sheets

(56) References Cited

U.S. PATENT DOCUMENTS

| | | | | | |
|---|---|---|---|---|---|
| 2011/0269346 | A1* | 11/2011 | Casher | H01R 29/00 | 439/626 |
| 2012/0108109 | A1* | 5/2012 | Zhang | H01R 12/721 | 439/629 |
| 2012/0282808 | A1* | 11/2012 | Luo | H01R 13/6471 | 439/628 |
| 2012/0315796 | A1* | 12/2012 | Pang | H01R 13/6471 | 29/874 |
| 2013/0005164 | A1* | 1/2013 | Smink | H01R 13/6597 | 439/92 |
| 2013/0288513 | A1* | 10/2013 | Masubuchi | H01R 31/08 | 439/386 |
| 2015/0031240 | A1* | 1/2015 | Yang | H01R 13/6588 | 439/607.08 |
| 2016/0156133 | A1* | 6/2016 | Masubuchi | H01R 13/6471 | 439/386 |

FOREIGN PATENT DOCUMENTS

| | | | | |
|---|---|---|---|---|
| JP | 5405582 | B2 | 2/2014 | |
| JP | 2016181529 | A * | 10/2016 | H01R 12/775 |

* cited by examiner

Fig.4
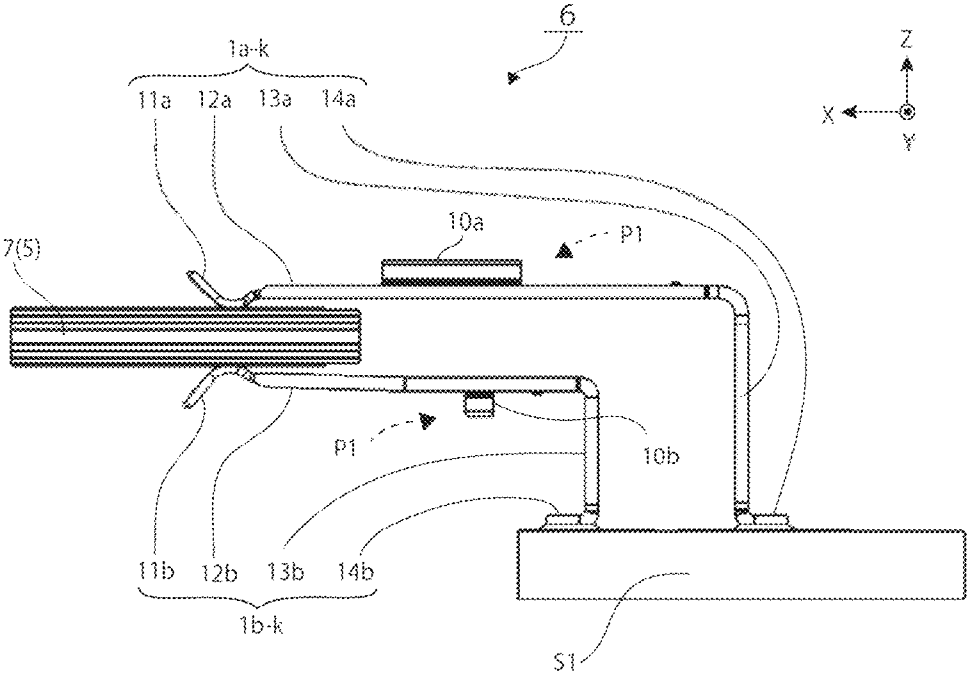
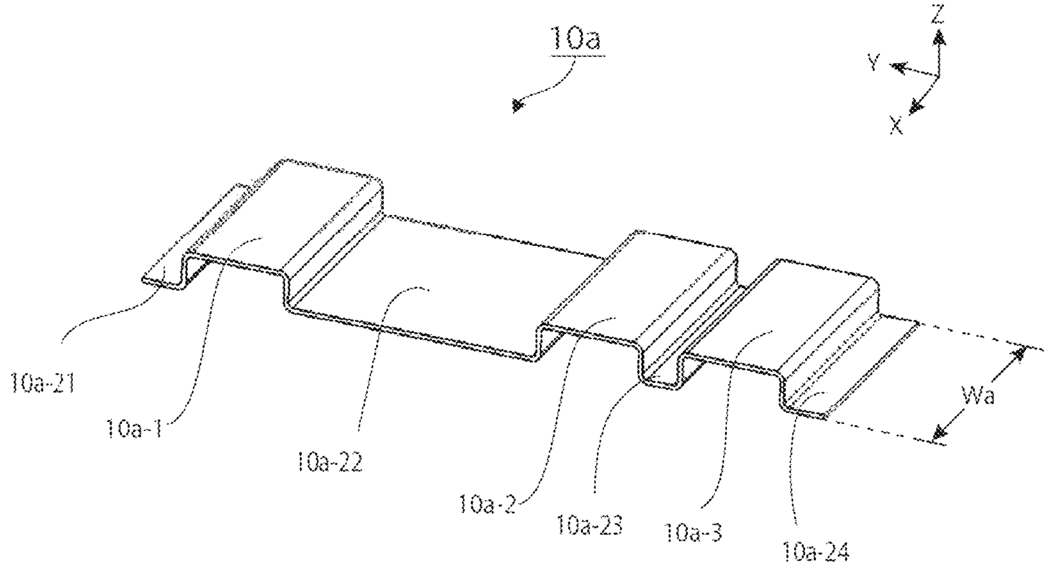
Fig.5

| | 1 | 2 | 3 | 4 | 5 | 6 | 7 | 8 | 9 | 10 | 11 |
|---|---|---|---|---|---|---|---|---|---|---|---|
| Top | PWR | GND | RX1 | GND | GND | GND | GND | LS | GND | TX1 | GND |
| Bottom | GND | RX2 | GND | LS | GND | GND | LS | GND | TX2 | GND | PWR |

| | 1 | 2 | 3 | 4 | 5 | 6 | 7 | 8 | 9 | 10 | 11 |
|---|---|---|---|---|---|---|---|---|---|---|---|
| Top | PWR | GND | RX1 | GND | GND | GND | GND | LS | GND | TX1 | GND |
| Bottom | GND | RX2 | GND | LS | GND | GND | LS | GND | TX2 | GND | PWR |

| | 1 | 2 | 3 | 4 | 5 | 6 | 7 | 8 | 9 | 10 | 11 |
|---|---|---|---|---|---|---|---|---|---|---|---|
| Top | PWR | GND | RX1 | GND | GND | GND | GND | LS | GND | TX1 | GND |
| Bottom | GND | RX2 | GND | LS | GND | GND | LS | GND | TX2 | GND | PWR |

NEXT

FEXT

Pin arrangement

| | 1 | 2 | 3 | 4 | 5 | 6 | 7 | 8 | 9 | 10 | > |
|---|---|---|---|---|---|---|---|---|---|---|---|
| Top | PWR | GND | RX1 | GND | GND | GND | GND | LS | GND | TX1 | GND |
| Bottom | GND | RX2 | GND | LS | GND | GND | LS | GND | TX2 | GND | PWR |

Pin arrangement

| | 1 | 2 | 3 | 4 | 5 | 6 | 7 | 8 | 9 | 10 | 11 |
|---|---|---|---|---|---|---|---|---|---|---|---|
| Top | PWR | GND | RX1 | GND | GND | GND | GND | LS | GND | TX1 | GND |
| Bottom | GND | RX2 | GND | LS | GND | GND | LS | GND | TX2 | GND | PWR |

Pin arrangement

| | 1 | 2 | 3 | 4 | 5 | 6 | 7 | 8 | 9 | 10 | 11 |
|---|---|---|---|---|---|---|---|---|---|---|---|
| Top | PWR | GND | RX1 | GND | GND | GND | GND | LS | GND | TX1 | GND |
| Bottom | GND | RX2 | GND | LS | GND | GND | LS | GND | TX2 | GND | PWR |

Pin arrangement

| | 1 | 2 | 3 | 4 | 5 | 6 | 7 | 8 | 9 | 10 | 11 |
|---|---|---|---|---|---|---|---|---|---|---|---|
| Top | PWR | GND | RX1 | GND | GND | GND | GND | LS | GND | TX1 | GND |
| Bottom | GND | RX2 | GND | LS | GND | GND | LS | GND | TX2 | GND | PWR |

| | 1 | 2 | 3 | 4 | 5 | 6 | 7 | 8 | 9 | 10 | 11 |
|---|---|---|---|---|---|---|---|---|---|---|---|
| Top | GND | RX1_n | RX1_p | GND | GND | GND | GND | GND | TX1_n | TX1_p | GND |
| Bottom | GND | RX2_n | RX2_p | GND | GND | GND | GND | GND | TX2_n | TX2_p | GND |

| | 1 | 2 | 3 | 4 | 5 | 6 | 7 | 8 | 9 | 10 | 11 |
|---|---|---|---|---|---|---|---|---|---|---|---|
| Top | GND | RX1 n | RX1 p | GND | GND | GND | GND | GND | TX1 n | TX1 p | GND |
| Bottom | GND | RX2 n | RX2 p | GND | GND | GND | GND | GND | TX2 n | TX2 p | GND |

| | 1 | 2 | 3 | 4 | 5 | 6 | 7 | 8 | 9 | 10 | 11 |
|---|---|---|---|---|---|---|---|---|---|---|---|
| Top | GND | RX1-n | RX1-p | GND | GND | GND | GND | GND | TX1-n | TX1-p | GND |
| Bottom | GND | RX2-n | RX2-p | GND | GND | GND | GND | GND | TX2-n | TX2-p | GND |

NEXT

FEXT

| | 1 | 2 | 3 | 4 | 5 | 6 | 7 | 8 | 9 | 10 | 11 |
|---|---|---|---|---|---|---|---|---|---|---|---|
| Top | GND | RX1-n | RX1-p | GND | GND | GND | GND | GND | TX1-n | TX1-p | GND |
| Bottom | GND | RX2-n | RX2-p | GND | GND | GND | GND | GND | TX2-n | TX2-p | GND |

NEXT

FEXT

CONNECTOR FOR HIGH-SPEED TRANSMISSION

CROSS-REFERENCE TO RELATED APPLICATION

This application claims the benefit of Chinese Patent application No. 202111289444.8 filed on Nov. 2, 2021, the contents of which are hereby incorporated by reference in its entirety.

TECHNICAL FIELD

The present disclosure relates to a connector for high-speed transmission.

BACKGROUND

Various techniques have been proposed to reduce the crosstalk in a connector for high-speed transmission. For example, in the connector assembly described in the specification of Japanese Patent No. 5405582 (hereinafter referred to as "Patent Document 1"), a plurality of grounding terminals arranged across a high-speed signal terminal in a housing are connected by a bridge to reduce the electrical lengths of the grounding terminals on both sides of the bridge and avoid the occurrence of crosstalk.

However, the bridge of the connector assembly in Patent Document 1 is configured to be fixed so as to hold two grounding terminals laterally, and it has been desired to realize a technical means capable of reducing crosstalk by a simpler configuration.

The present disclosure has been made in view of such a problem, and one of main objects is to provide a connector for high-speed transmission capable of reducing crosstalk.

SUMMARY

In accordance with a first aspect of the present disclosure, there is provided a connector for high-speed transmission including: a housing with an opening portion into which a communication partner is fitted; a column of a plurality of contacts including a contact for ground; and a metal member which is disposed in the column of the contacts, shorts the contact for ground and is bent so as to avoid contacts other than the contact for ground. The contact has a contact portion in contact with the communication partner, a first linear portion extending rearward from a rear end of the contact portion, a second linear portion bent and extending from a rear end of the first linear portion and a terminal portion soldered to an external substrate at a tip end of the second linear portion. The metal member is disposed to extend between a contact at one end and a contact at the other end of the column of the plurality of contacts, has a bent portion bent in a U-shape across the contacts other than the contact for ground, and is connected to at least one of the first linear portion and the second linear portion of the contact for ground.

Further features of the present invention will become apparent from the following description of exemplary embodiments with reference to the attached drawings.

BRIEF DESCRIPTION OF THE DRAWINGS

FIG. 4 is a right-side view of the schematic configuration shown in FIG. 3;

FIG. 5 is an example of an enlarged view of the upper metal member shown in FIG. 3;

DETAILED DESCRIPTION OF THE DRAWINGS

Figure 1:
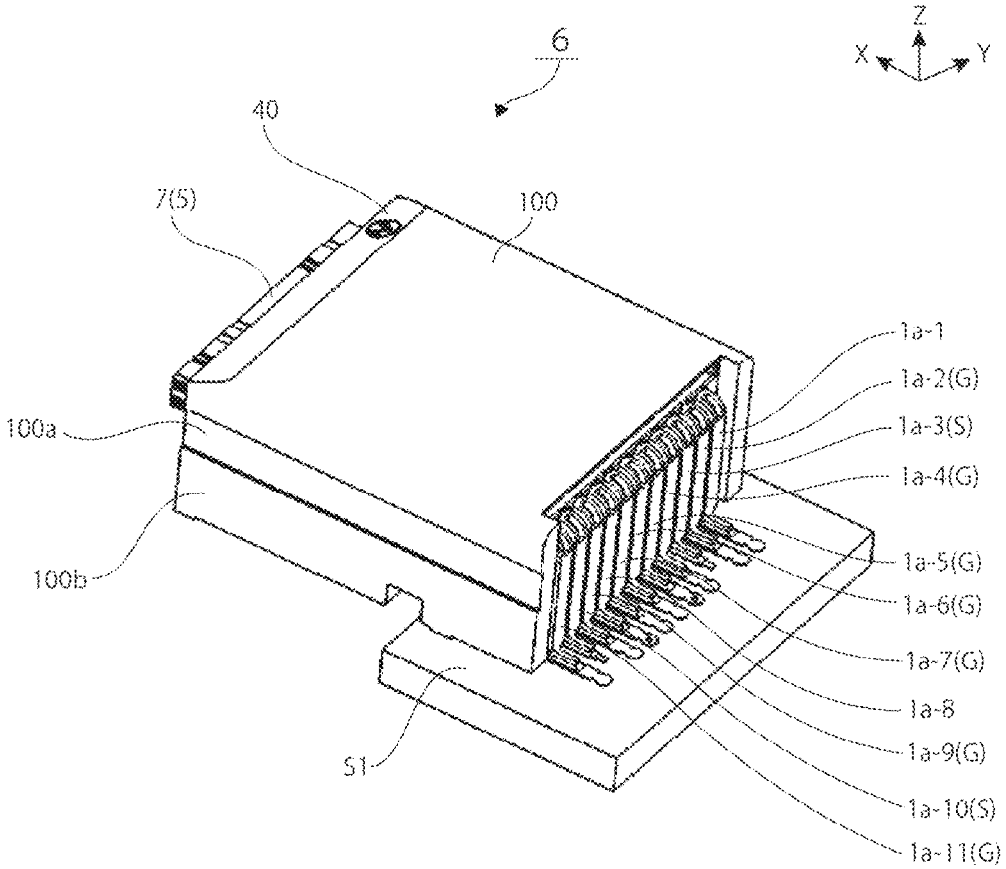
FIG. 1 is an example of a perspective view showing an appearance configuration of a connector according to a first embodiment of the present disclosure.

Hereinafter, some of the embodiments of the present disclosure will be described with reference to the drawings. In the drawings, the same or corresponding elements and members are designated by the same reference numerals, and duplicate description thereof will be omitted as appropriate. In addition, it should be noted that the shapes and sizes of the members shown in the drawings may not be consistent with the actual scale and ratio in order to appropriately enlarge, reduce or omit them for the purpose of facilitating explanation.

The first, second, etc., ordinal terms used below are merely distinguishing marks for distinguishing the same or corresponding components, and the same or corresponding components are not limited by the first, second, etc.

As used herein, "connect" or "couple" is a concept that includes not only the case where components are physically in direct contact with each other in the contact relationship between the components, but also the case where other configurations are interposed between the components and the respective components are in contact with the other configurations. In addition, the term "substantially" is used to include measurement errors.

(1) First Embodiment

As shown in FIG. 1 to FIG. 4, a connector for high-speed transmission 6 according to the first embodiment is mounted on a circuit board S1 and used. A header 7 of an optical transceiver 5, which is a device of a communication partner, is fitted into a slot 40 of the connector for high-speed transmission 6. A card edge which is a printed circuit board as an electrical interface is exposed at a tip end of the header 7, and each PIN of the printed circuit board and each contact of the connector 6 are electrically connected by fitting into the slot 40. The slot 40, for example, corresponds to an "opening portion" defined in the claims. It is to be noted that, in FIG. 1, a part of the optical transceiver 5 except for the header 7 is omitted to facilitate understanding.

In the following description, the mounting direction of the connector for high-speed transmission 6 with respect to the circuit board S1 is referred to as a Z direction, a direction in which the optical transceiver 5 is fitted into the slot 40 of the connector for high-speed transmission 6 is referred to as an X direction, and a direction orthogonal to both the Z direction and the X direction is referred to as a Y direction. In addition, the +Z side which is the side of the connector for high-speed transmission 6 in the Z direction is appropriately referred to as an "upper side", and the −Z side which is the side of the circuit board is appropriately referred to as a "lower side". In addition, the +X side which is the side of the optical transceiver 5 in the X direction is appropriately referred to as a "front side", and the −X side which is the side of the connector for high-speed transmission 6 is appropriately referred to as a "rear side". In addition, the +Y side which is the left side as viewed from the +X side which is the side of the optical transceiver 5 is appropriately simply referred to as a "left side", and the −Y side which is the right side as viewed from the +X side which is the side of the optical transceiver 5 is appropriately simply referred to as a "right side".

Figure 2:
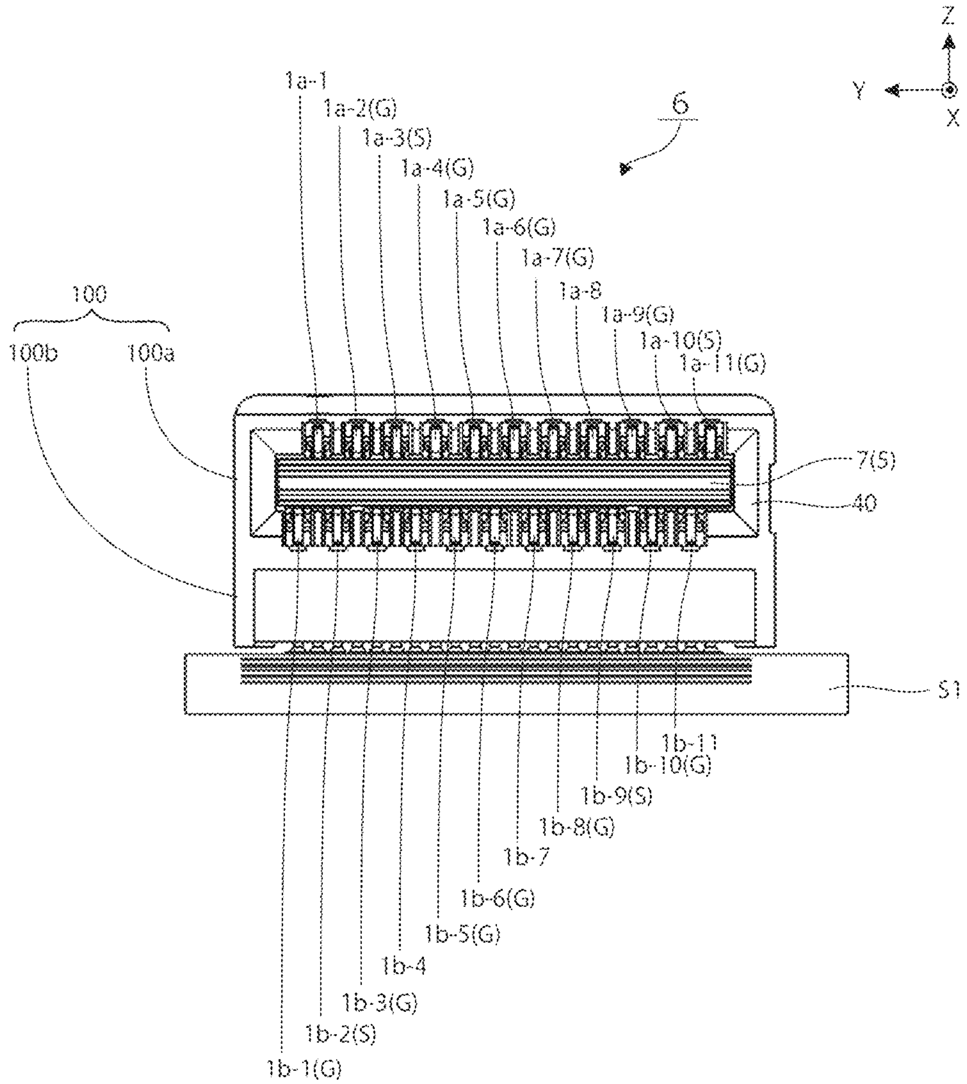
FIG. 2 is a front view of the connector shown in FIG. 1, and is a diagram showing an example of PIN arrays on an upper surface and a lower surface of a header of an optical transceiver.

Although not particularly shown, the optical transceiver 5 has a stick shape in the present embodiment, and the header 7 protrudes from the end portion on the front side of the optical transceiver 5. The upper side and the left and right sides of the header 7 are covered by a housing. As shown in FIG. 2, first to eleventh pad columns are formed on the upper surface of the header 7.

For example, as described in the PIN array table in the upper section of FIG. 7, in the present embodiment, the first to the eleventh PIN columns on the upper side of the header 7 are arranged as follows corresponding to the PIN array (Top) of FIG. 7. That is, a power line (PWR) is arranged in the first PIN of the left end, and a contact for ground GND is assigned to each of the second PIN which is number two, the fourth PIN which is number four, the fifth PIN which is number five, the sixth PIN which is number six, the seventh PIN column which is number seven, and the ninth PIN which is number nine from the left end, and the eleventh PIN which is number eleven of the right end. In addition, a contact for reception signal RX1 and a contact for transmission signal TX1 are assigned to the third PIN which is number three from the left end and the tenth PIN which is number two from the right end, respectively. A contact for low-speed control signal LS is assigned to the eighth PIN which is number eight from the left end.

In the present embodiment, the first to the eleventh PIN columns on the lower surface of the header 7 are arranged as follows corresponding to the PIN array (Bottom) of FIG. 7. That is, a contact for ground GND is assigned to each of the first PIN of the left end, the third PIN which is number three from the left end, the fifth and sixth PINs which are number five and number six from the left end, and the eighth and the tenth PINs which are number eight and number ten from the left end. In addition, a contact for reception signal RX2 and a contact for transmission signal TX2 are assigned to the second PIN which is number two from the left end and the ninth PIN which is number three from the right end, respectively. Further, a contact for low-speed control signal LS is assigned to each of the fourth PIN which is number four and the seventh PIN which is number seven from the left end.

Figure 3:
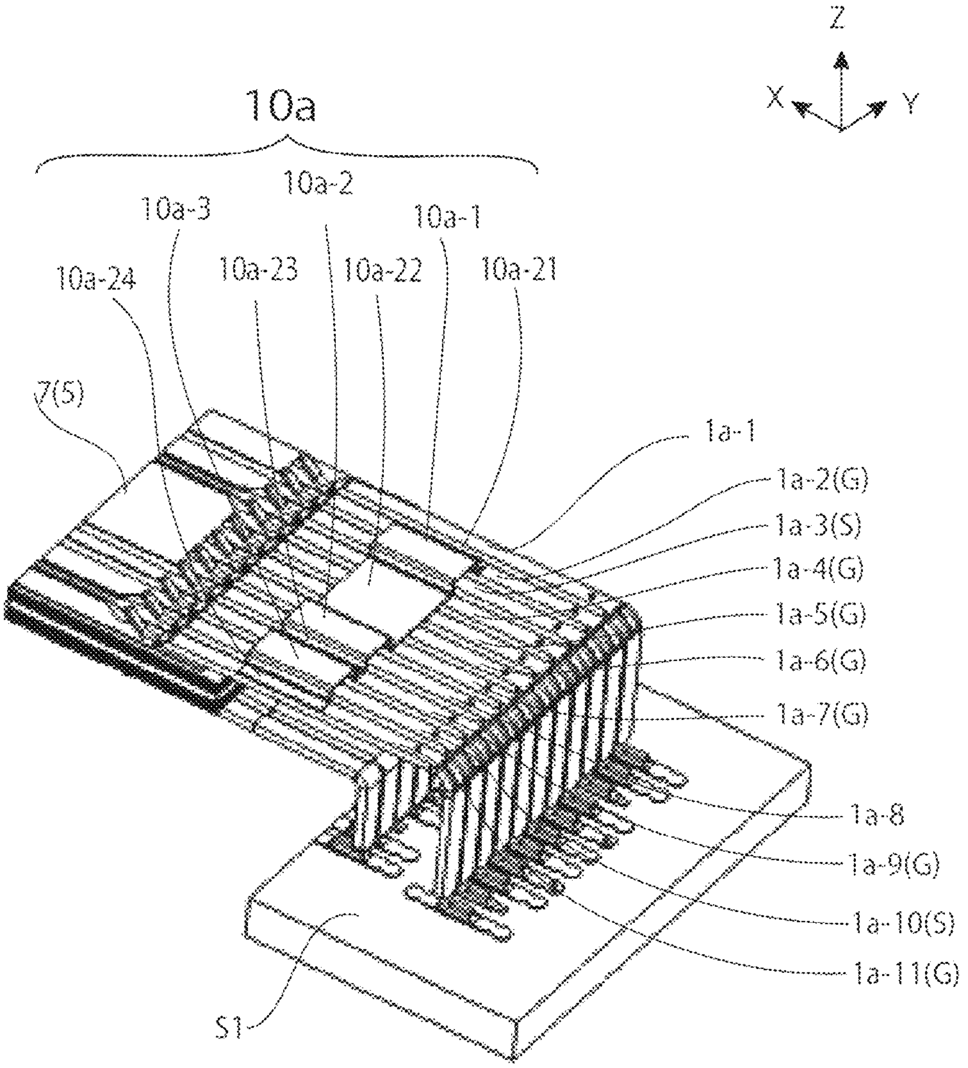
FIG. 3 is an example of a perspective view making the schematic configuration of contacts and an upper metal member clear with the housing omitted from the connector shown in FIG. 1.

As shown in FIG. 1 to FIG. 3, the connector for high-speed transmission 6 has a housing 100, contacts 1*a-k* (k=1 to 11) and contacts 1*b-k* (k=1 to 11). As shown in FIG. 4, the contacts 1*a-k* (k=1 to 11) and 1*b-k* (k=1 to 11) are each formed by extending a rod-like metal piece forward and backward and bending it so as to bend a plurality of places, k (=11) contacts are arranged side by side by on the left and right, and correspond to the left end to the right end (number one to number eleven of the left end) of the PIN array shown in FIG. 2, respectively. The contacts 1*a-k* (k=1 to 11) and contacts 1*b-k* (k=1 to 11) correspond, for example, "the first column of contacts" and "the second column of contacts" defined in the claims, respectively.

As shown in FIG. 2, the housing 100 has an upper housing 100*a* and a lower housing 100*b*, and these housings 100*a*, 100*b* are integrally molded, for example, by using plastic as a material in the present embodiment. The contacts 1*a-k* (k=1 to 11) of the upper section are supported by the upper housing 100*a* and the contacts 1*b-k* (k=1 to 11) of the lower section are supported by the lower housing 100*b*. The upper housing 100*a* and the lower housing 100*b* correspond, for example, to the "upper plate portion" and the "lower plate portion" defined in the claims, respectively.

As shown in the abbreviated right-side view of FIG. 4, the contact 1*a-k* has a tip end side contact portion 11*a* bent to form an arch shape inverted upside down, a linear portion 12*a* extending rearward from a rear end of the tip end side contact portion 11*a*, a linear portion 13*a* extending downward from a rear end of the linear portion 12*a*, and a substrate side contact portion 14*a* extending rearward from a lower end of the linear portion 13*a*. The substrate side contact portion 14*a* is electrically connected to a corresponding pad on the substrate S1 by soldering or the like.

Corresponding to the shape of the contact 1*a*-*k*, the contact 1*b*-*k* has a tip end side contact portion 11*b* bent to form an arch shape, a linear portion 12*b* extending from a rear end of the tip end side contact portion 11*b* toward the rear side of contact 1*b*-*k*, a linear portion 13*b* bent downward from a rear end of the linear portion 12*b* and extending downward, and a substrate side contact portion 14*b* bent forward from a lower end of the linear portion 13*b* and extending forward. The substrate side contact portion 14*b* is also electrically connected to a corresponding pad on the substrate S1 by soldering or the like.

In the present embodiment, the tip end side contact portions 11*a*, 11*b* correspond, for example, to the "contact portion" defined in the claims, and the linear portions 12*a*, 12*b* correspond, for example, to "the first linear portion" defined in the claims. In addition, the linear portions 13*a*,13*b* correspond, for example, to "the second linear portion" defined in the claims, and the substrate side contact portions 14*a*,14*b* correspond, for example, to the "terminal portion" defined in the claims.

It is to be noted that, in the attached drawings, letter (G) is appropriately added to the contacts 1*a*-*k*, 1*b*-*k* in contact with the contact for ground GND, and letter (S) is appropriately added to the contacts 1*a*-*k*, 1*b*-*k* in contact with the contact for signal SIG to distinguish them.

As shown in FIG. 3 and FIG. 4, the connector for high-speed transmission 6 of the present embodiment has a metal member 10*a* disposed on the upper side of the contacts 1*a*-*k* in the left and right (Y direction) between a contact at one end (for example, 1*a*-1) and a contact at the other end (for example, 1*a*-11) of the column of contacts 1*a*-*k*.

In addition, as shown in FIG. 4, the connector for high-speed transmission 6 has a metal member 10*b* disposed on the lower side of the contacts 1*b*-*k* in the left and right (Y direction) between a contact at one end (for example, 1*ab*-1) and a contact at the other end (for example, 1*b*-11) of the column of contacts 1*b*-*k*.

Materials similar to general conductors such as copper (Cu), copper alloy, aluminum (Al), gold (Au) or the like can be used as the material of the metal members 10*a*, 10*b*.

Figure 7:
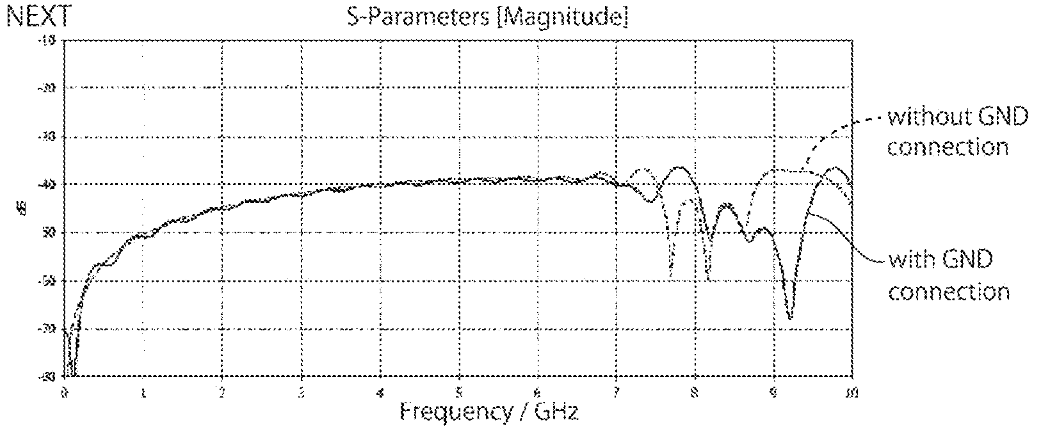
FIG. 7 shows graphs indicating an example of a simulation result on the crosstalk improvement effect by the metal members regarding the connector according to the first embodiment.
Figure 7:
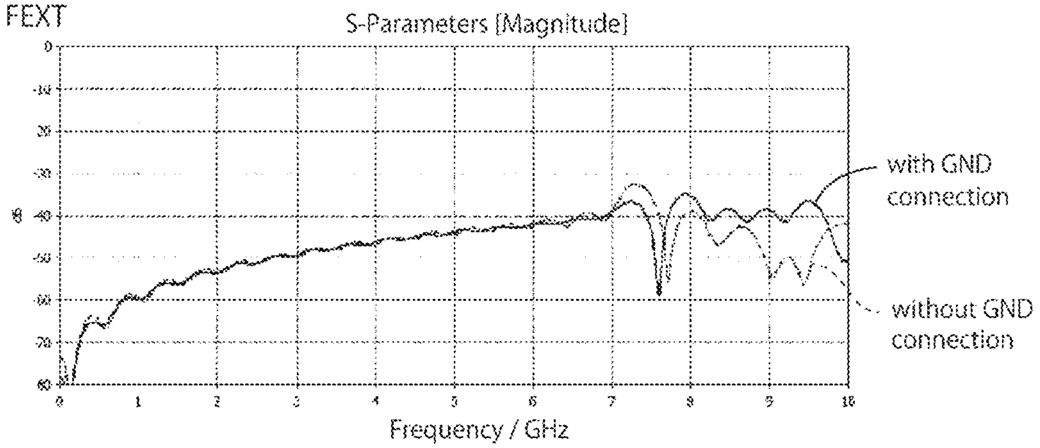

The metal member 10*a* has base portions 10*a*-21,10*a*-22, 10*a*-23,10*a*-24 electrically connected to contacts for ground 1*a*-*k* connected to the PINs for ground among the first to the eleventh PIN arrays of the upper section (Top) of the table shown in FIG. 7, and bent portions 10*a*-1,10*a*-2,10*a*-3 bent upward so as to form a shape in which a "U" shape is inverted upside down to avoid contacts for signal 1*a*-*k* other than these contacts for ground. More specifically, as shown in FIG. 3 and FIG. 5, in the present embodiment, the metal member 10*a* has such a shape that it is in contact with the contacts 1*a*-2(G), 1*a*-4(G) to 1*a*-7(G), 1*a*-9(G) and 1*a*-11(G) on their upper surfaces by the base portions to electrically connect them, and avoids contact so as to be electrically disconnected from the contacts 1*a*-3(S), 1*a*-8,1*a*-10(S) by the bent portions separated upward.

More specifically, the base portion 10*a*-21 is electrically connected to the contact 1*a*-2(G) on its upper surface, the base portion 10*a*-22 is electrically connected to the contact 1*a*-4(G), contact 1*a*-5(G), contact 1*a*-6(G) and contact 1*a*-7 (G) on their upper surfaces, the base portion 10*a*-23 is electrically connected to the contact 1*a*-9(G) on its upper surface, and the base portion 10*a*-24 is electrically connected to the contact 1*a*-11(G) on its upper surface.

The base portions 10*a*-21 and 10*a*-22 are connected to the bent portion 10*a*-1 and extend in the column direction (±Y direction) from the bent portion 10*a*-1. The base portions 10*a*-23, 10*a*-24 are connected to the bent portion 10*a*-3 and extend in the column direction (±Y direction) from the bent portion 10*a*-3. The base portion 10*a*-23 is also connected to the bent portion 10*a*-2, thereby, extending in the column direction (−Y direction) from the bent portion 10*a*-2.

The first bent portion 10*a*-1 is separated from the contact 1*a*-3(S) that transmits the reception signal RX1, the second bent portion 10*a*-2 is separated from the contact 1*a*-8 that transmits the low-speed signal LS, and further, the third bent portion 10*a*-3 is separated from the contact 1*a*-10(S) that transmits the transmission signal TX1. It is to be noted that, since the contact 1*a*-1 is located outside (+Y) to the left of the metal member 10*a*, it does not come into contact with the metal member 10*a*.

The width, thickness and arrangement location of the metal member 10*a* are described in detail later.

In addition, the metal member 10*b* has base portions 10*b*-20 to 10*b*-24 electrically connected to the contacts for ground 1*b*-*k* connected to the PINs of the GNDs among the first to eleventh PIN columns of the lower section (Bottom) of the table shown in FIG. 7, and bent portions 10*b*-1 to 10*b*-4 bent in an approximate "U" shape downward to avoid contacts for signal other than these contacts for ground 1*b*-*k*. The base portions 10*b*-20, 10*b*-21 are connected to the bent portion 10*b*-1 and extend in the column direction (±Y direction) from the bent portion 10*b*-1. The base portion 10*b*-21 is also connected to the bent portion 10*b*-2. The base portions 10*b*-22, 10*b*-23 are connected to the bent portion 10*b*-3 and extend in the column direction (±Y direction) from the bent portion 10-3. The base portion 10*a*-22 is also connected to the bent portion 10*b*-2. The base portion 10*b*-24 is connected to the bent portion 10*b*-4 and extends in the column direction (−Y direction).

Figure 6:
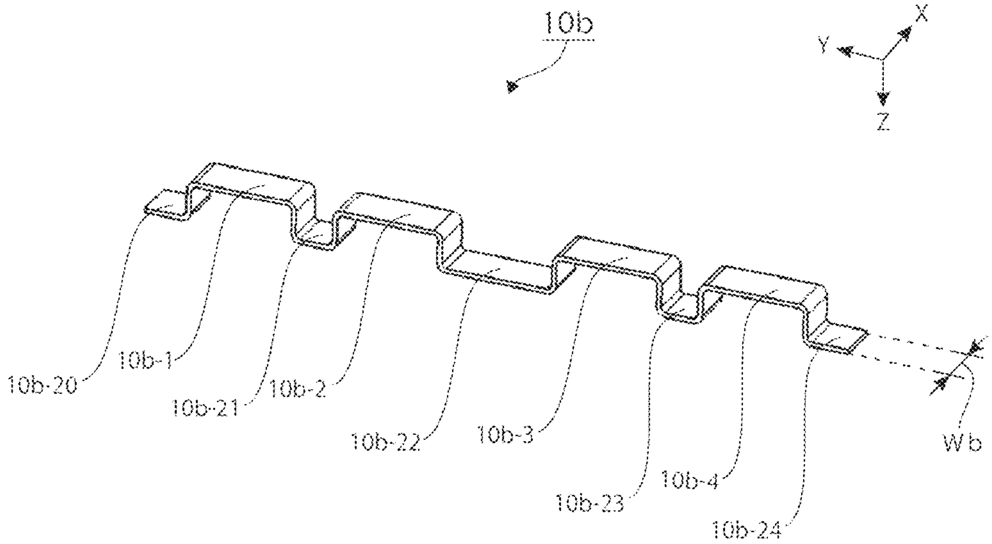
FIG. 6 is an example of a perspective view showing a lower metal member shown in FIG. 4.

More specifically, as shown in FIG. 6, in the present embodiment, the metal member 10*b* has such a shape that it is in contact with the contacts 1*b*-1(G), 1*b*-3(G), 1*b*-5(G), 1*b*-6(G), 1*b*-8(G) and 1*b*-10(G) from the lower surfaces to electrically connect them, and avoids contact so as to be electrically disconnected from the contacts 1*b*-2(S), 1*b*-4, 1*b*-7,1*b*-9(S) by being separated downward. More specifically, the base portion 10*b*-20 is in contact with and electrically connected to the contact 1*b*-1(G) from its lower surface, the base portion 10*b*-21 is in contact with and electrically connected to the contact 1*b*-3(G) from its lower surface, the base portion 10*b*-22 is in contact with and electrically connected to the contacts 1*b*-5(G) and 1*b*-6(G) from their lower surfaces, the base portion 10*b*-23 is in contact with and electrically connected to the contact 1*b*-8 (G) from its lower surface, and further, the base portion 10*b*-24 is in contact with and electrically connected to the contact 1*b*-10(G) from its lower surface. In addition, the first bent portion 10*b*-1 is separated downward from the contact 1*b*-2(S) that transmits the reception signal RX2, the second bent portion 10*b*-2 is separated downward from the contact 1*a*-4 that transmits the low-speed signal LS, the third bent portion 10*b*-3 is separated downward from the contact 1*a*-7 that transmits the low-speed signal LS, and the fourth bent portion 10*b*-4 is separated downward from the contact 1*a*-9(S) that transmits the transmission signal TX2. It is to be noted that, since the contact 1*b*-11 is located outside (−Y side) to the right of the metal member 10*b*, it does not come into contact with the metal member 10*b*. It is to be noted that, in FIG. 6, the metal member 10*b* is drawn by inverting the top and bottom (Z direction) from the actual arrangement to facilitate explanation.

The width, thickness and arrangement location of the metal member 10 *b* are also described in detail later.

The metal members 10*a*, 10*b* can be attached to the GND contact, for example, by laser welding, solder connection, conductive resin connection, bump connection, ACF connection, conductive rubber, etc.

Hereinafter, the effect of crosstalk reduction by these metal members 10*a*, 10*b* is described in detail based on several graphs displaying the simulation results. Here, a series of graphs shown in FIG. 7 to FIG. 11, FIG. 13, FIG. 15, and FIG. 21 to FIG. 23 all show the relationship between the signal speed and the crosstalk signal intensity with the vertical axis as decibel (dB) and the horizontal axis as frequency (GHz).

The graphs of FIG. 7 show an example of the result of performing simulation on the improvement effect of impedance in the present embodiment where the metal members 10*a*,10*b* are provided (with GND connection) compared to a conventional example where the metal members 10*a*,10*b* are not provided (without GND connection). The same graphs are an example of the result of simulating the near end crosstalk (Near End X (Cross) Talk; hereinafter simply referred to as "NEXT") and the far end crosstalk (Far End X (Cross) Talk; hereinafter simply referred to as "FEXT") for the signal line (TX1, number ten from the left) in the PIN array of the upper section and the signal line (TX2, number nine from the left) of the PIN array of the lower section.

As shown in FIG. 7, TX1, which is number ten from the left of the upper section, and the TX2, which is number nine from the left of the lower section, are close to each other, so there is no significant difference in crosstalk with or without GND connection regarding the NEXT and the FEXT.

Figure 8:
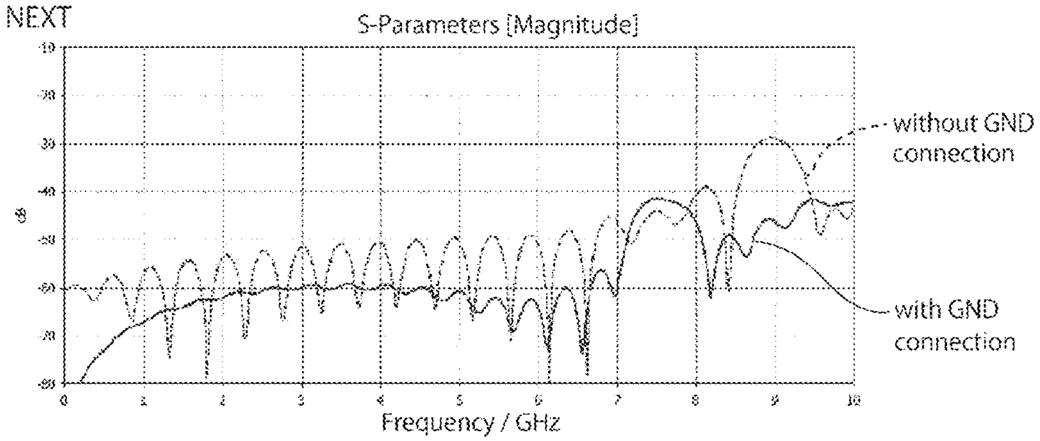
FIG. 8 shows graphs indicating another example of the simulation result on the crosstalk improvement effect by the metal members regarding the connector according to the first embodiment.
Figure 8:
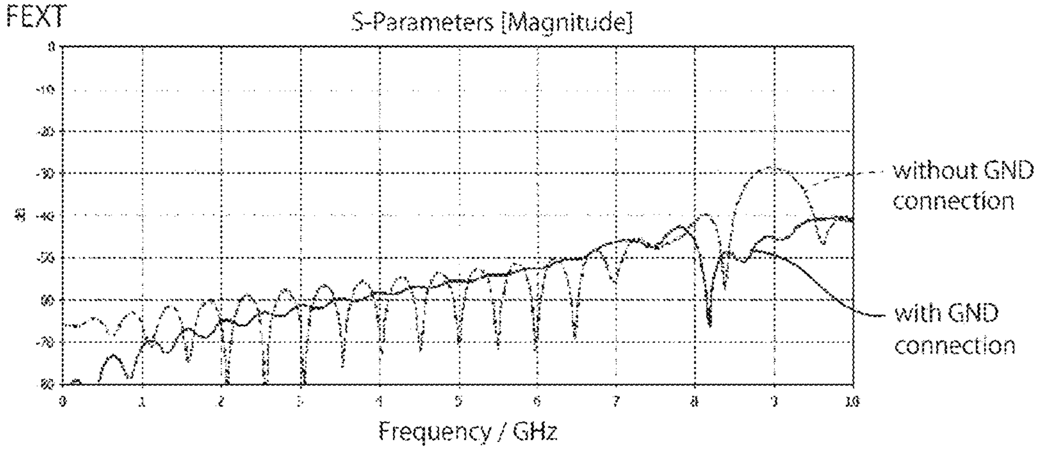

On the other hand, the graphs of FIG. 8, similarly, show an example of the result of performing simulation on the improvement effect of impedance in the present embodiment where the metal members 10*a*,10*b* are provided (with GND connection) compared to a conventional example where the metal members 10*a*,10*b* are not provided (without GND connection), and are an example of the result of simulating the NEXT and the FEXT for the signal lines separated from each other in the PIN array of the upper section, that is, the RX1 which is number three and the TX1 which is number ten from left.

From FIG. 8, it is known that regarding the NEXT, the signal intensity in the case of "with GND connection" is generally lower than the signal intensity of twice that of "without GND connection", and in particular, it is greatly decreased at 8 to 9 GHz, from this, a significant improvement in crosstalk can be seen in the case of the present embodiment. Also, regarding the FEXT, there is a frequency band indicating a downward spike with a low signal intensity in the case of "without GND connection" at about 7 GHz or less, but it is lower in the case of "with GND connection" at the peak point, and the signal intensity is greatly decreased at 8 to 9 GHz and its peripheral frequency bands. From this, it can be said that there is an improvement in crosstalk in the case of the present embodiment.

Figure 9:
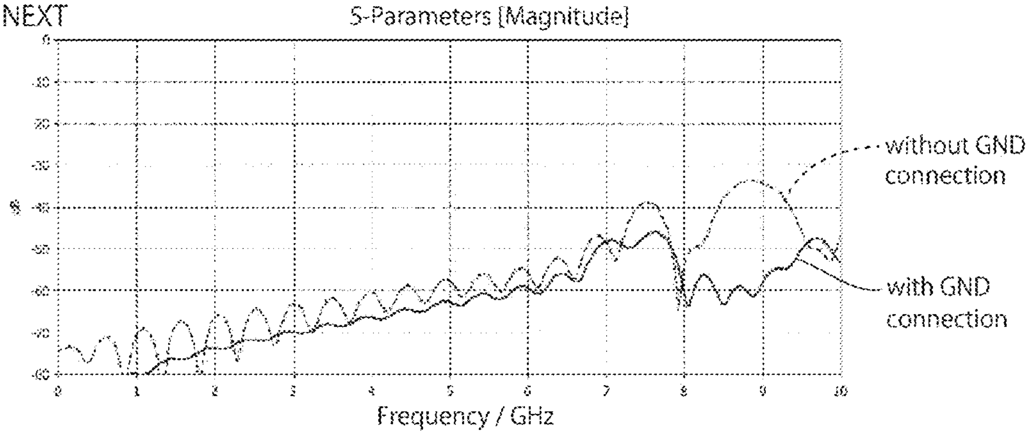
FIG. 9 shows graphs indicating yet another example of the simulation result on the crosstalk improvement effect by the metal member regarding the connector according to the first embodiment.
Figure 9:
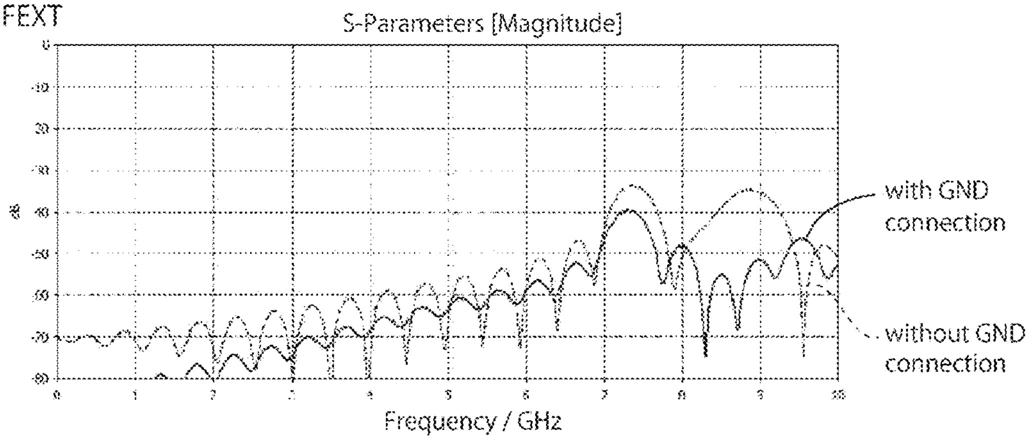

Similarly, the graphs of FIG. 9 also show an example of the simulation result of comparing a conventional example without a GND connection and the present embodiment with a GND connection. But in the present example, it is an example of the result of simulating the NEXT and the FEXT for the signal lines separated from each other in the PIN arrays of the upper section and the lower section, that is, the TX1 which is number ten from the left of the upper section and the RX2 which is number two from the left of the lower section.

Similar to the case of FIG. 8, it has been found that improvement in crosstalk can be seen in the case of the present embodiment for both the NEXT and the FEXT.

Thus, according to the present embodiment, since there are metal members 10*a*, 10*b* that are respectively disposed on the upper side and lower side of the contacts 1*a-k* (k=1 to 11) and the contacts 1*b-k* (k=1 to 11) respectively supported by the upper housing 100*a* and the lower housing 100*b* of the housing 100, and have bent portions bent to avoid the contacts other than the contacts for ground while shorting the contacts for ground, a connector for high-speed transmission 6 with a simple configuration and reduced crosstalk is provided.

About the Sizes and Arrangement Locations of the Metal Members

1) The Width of the Upper Metal Member

The width Wa of the upper metal member 10*a* is preferably 1.0 mm to 2.5 mm.

Figure 10:
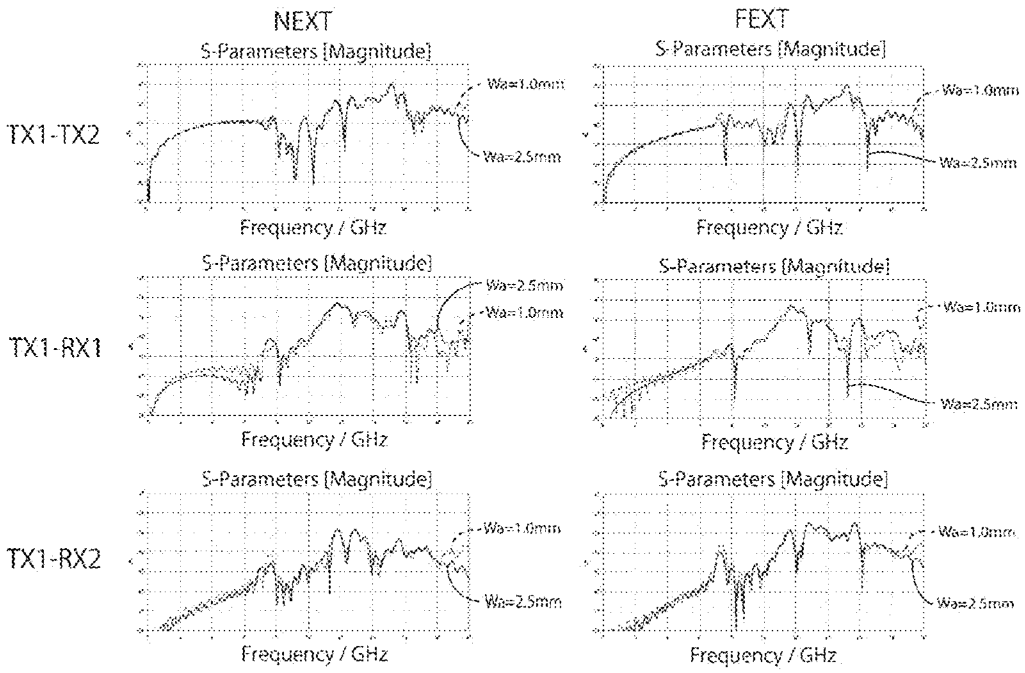
FIG. 10 shows graphs indicating an example of a simulation result of crosstalk for obtaining a suitable value regarding the width of the upper metal member.

In FIG. 10, an example of the result of simulating crosstalk in the case of Wa=1.0 mm and the case of Wa=2.5 mm is shown. The NEXT and the FEXT have been simulated for the TX2 which is number nine from the left of the lower section and the TX1 which is number ten from the left of the upper section, the TX1 which is number ten from the left of the upper section and the RX1 which is number three from the left of the upper section, and the TX1 which is number ten from the left of the upper section and the RX2 which is number two from the left of the lower section, respectively.

From the result shown in FIG. 10, it can be seen that the impedance characteristics generally do not change much at width 1.0 mm and width 2.5 mm, but in the case of the TX1 and the RX1, a significant difference can be seen in both a low-speed region and a high-speed region outside the region of 8 GHz to 18 GHz for the NEXT. From this, it can be said that it is desirable to select 2.5 mm as the width Wa of the upper metal member 10*a*.

2) The Width of the Lower Metal Member

The width Wb of the lower metal member 10*b* is preferably 0.5 mm to 1.0 mm.

Figure 11:
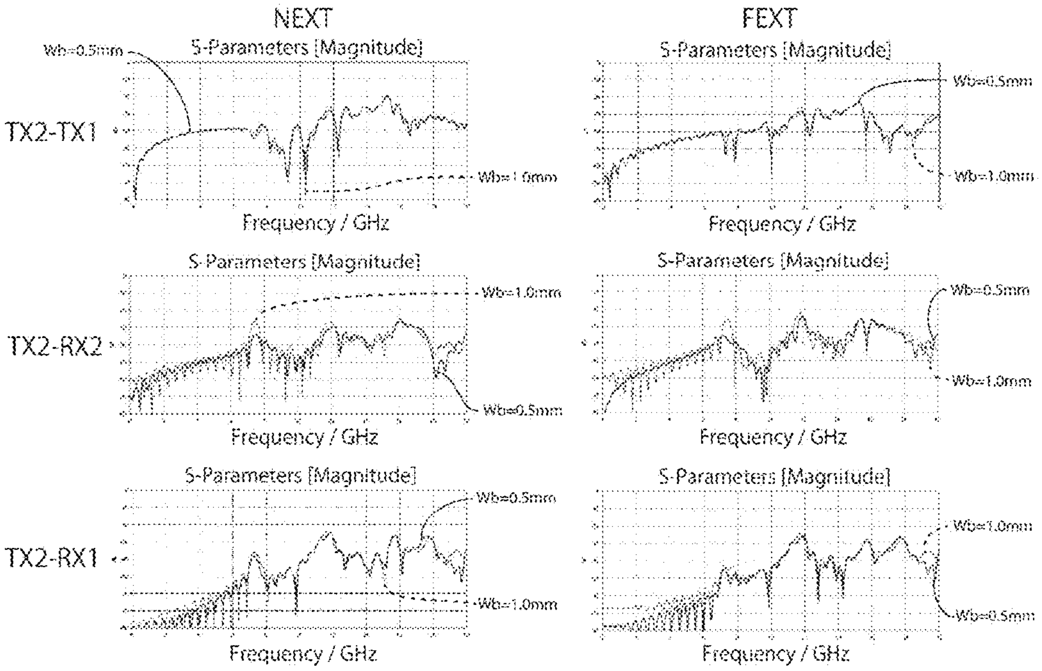
FIG. 11 shows graphs indicating a simulation result of crosstalk for obtaining a suitable value regarding the width of the lower metal member.

FIG. 11 is an example of the result of simulating crosstalk in the case of Wb=0.5 mm and the case of Wb=1.0 mm. NEXT and FEXT have been simulated for the TX2 and the TX1, the TX2 and the RX2, and the TX2 and the RX1, respectively.

From the graphs of FIG. 11, it can be seen that in the case of the TX2 and the RX1, peaks of 7 to 8 GHz have been improved in both the NEXT and the FEXT, so it is desirable to select 0.5 mm as the width Wb of the lower metal member 10*b*.

3) The (Front and Rear) Position of the Metal Member

Figure 12:
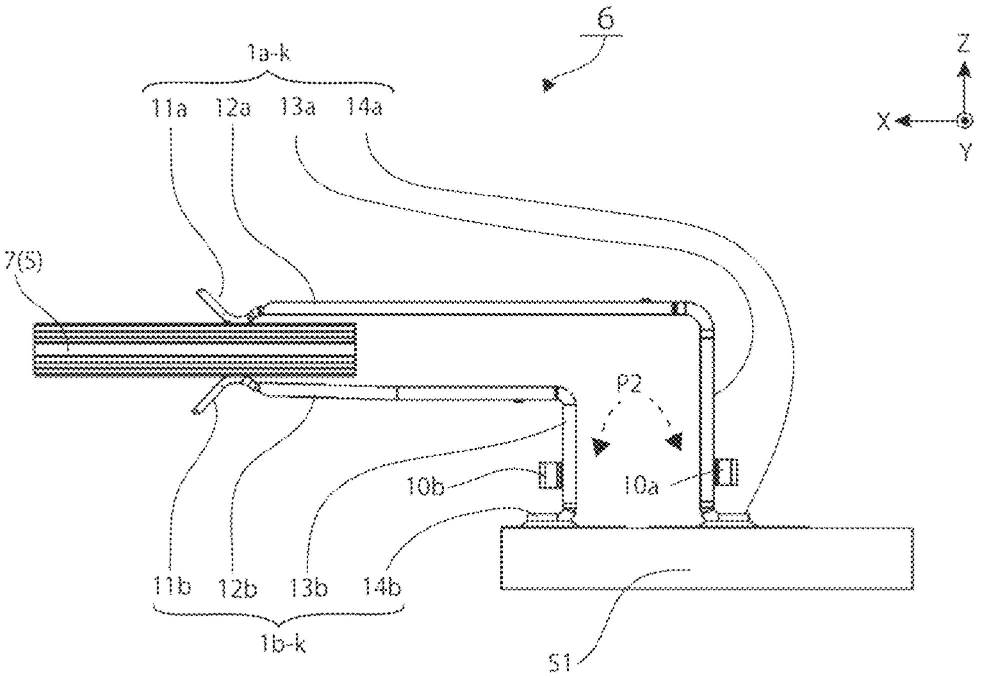
FIG. 12 is an example of disposing the metal members at positions different from the positions shown in FIG. 4.

As for the arrangement positions of the upper metal member 10*a* and the lower metal member 10*b* in the front-rear (X) direction, an arbitrary position can be selected between the upper linear portion 12*a* and the lower end of the linear portion 13*a* in the up-down (Z) direction shown in FIG. 12 for the upper metal member 10*a*, and the lower metal member 10*b* can be arbitrarily set between the lower linear portion 12*b* and the lower end of the linear portion 13*b* in the Z direction shown in FIG. 12.

The upper metal member 10*a* is preferably disposed near the middle of the upper linear portion 12*a*, and the lower metal member 10*b* is preferably disposed near the middle of the lower linear portion 12*b*. In this case, the upper metal member 10*a* and the lower metal member 10*b* are disposed so as to be almost opposed via the upper linear portion 12*a* and the lower linear portion 12*b* in-between.

Figure 13:
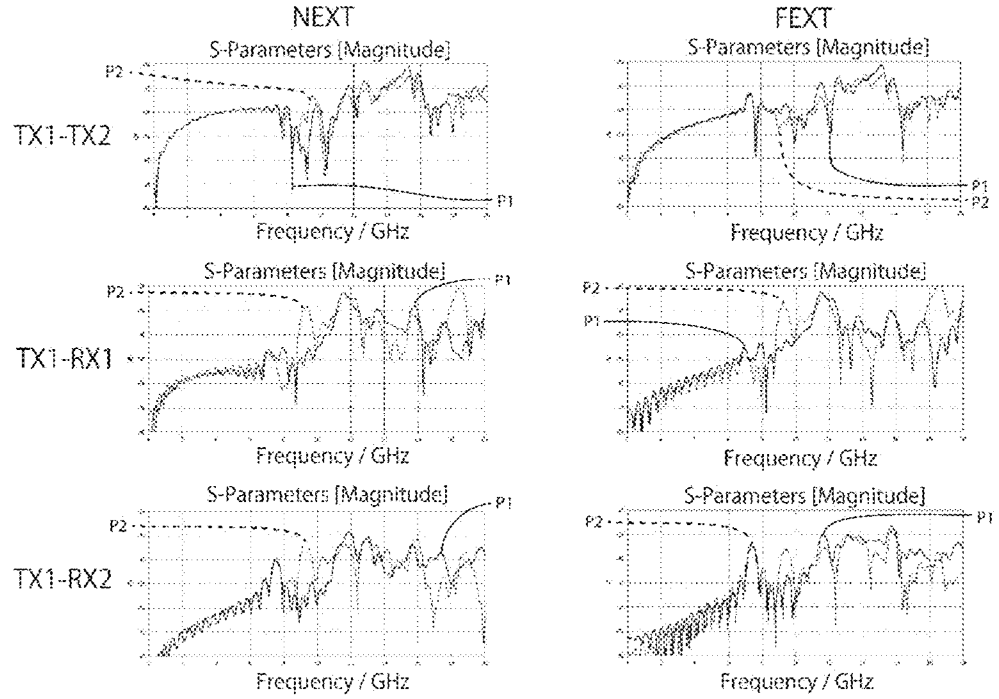
FIG. 13 shows graphs indicating a simulation result for obtaining the difference in crosstalk when the metal members are disposed at the positions shown in FIG. 4 and when the metal members are disposed at the positions shown in FIG. 12.

When the NEXT and the FEXT are simulated for the TX1 and the TX2, the TX1 and the RX1, and the TX1 and the RX2, respectively, at the installation positions of the metal members of P1 in FIGS. 4 and P2 in FIG. 12, as shown in the graphs respectively indicated by the symbols P2,P1 in FIG. 13, the noise value due to crosstalk in the frequency band of 8 GHz or more is generally lower at the substantially center of the upper linear portion 12*a* and the position P1(FIG. 4) on the lower surface of the lower linear portion 12*b* which is almost directly below the upper linear portion 12*a* than the lower ends of the linear portions 13*a*,13*b* and the position P2 (FIG. 12) in front of the linear portions 13*a*,13*b*. It can be judged that it has good characteristics.

4) The Number of the GNDs Connected

Figure 14:
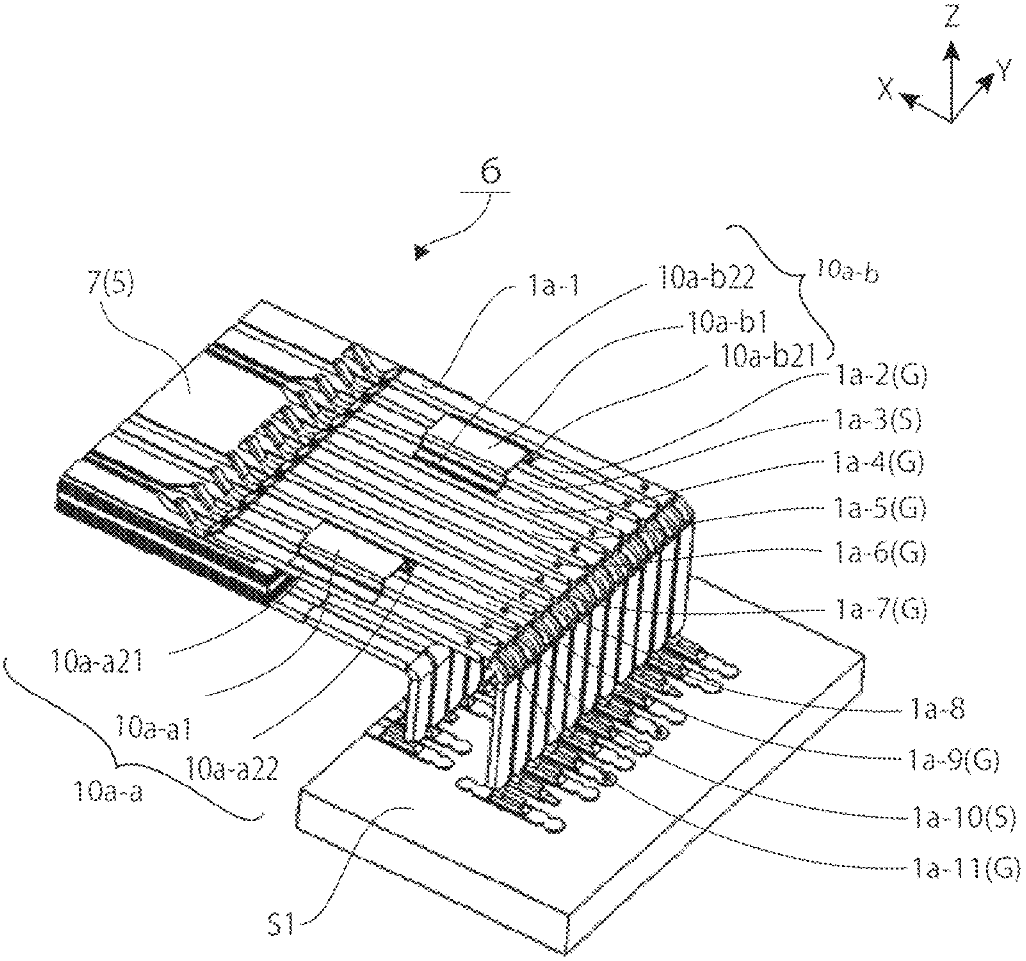
FIG. 14 is an example of a perspective view showing a configuration example in which only a part of GNDs are connected to the metal member.

As for the number of GND connections by the metal members 10*a*,10*b*, in addition to the case where all the GNDs are connected as shown in FIG. 3, only a part of the GNDs may be connected like the metal members 10*a-a*, 10*a-b* shown in FIG. 14. The metal member 10*a-a* has a bent portion 10*a*-a1, and a base portion 10*a-a*21 and a base portion 10*a-a*22 connected to the bent portion 10*a*-a1 and extending in the column direction (±Y direction) from the bent portion 10*a*-a1. The base portion 10*a-a*21 and the base portion 10*a-a*22 are respectively electrically connected to respective upper surfaces of the contacts 1*a*-11(G) and 1*a*-9(G) by contacting them, and the bent portion 10*a*-a1 is separated from the contact 1*a*-10(S). Similarly, the metal member 10*a-b* has a bent portion 10*a-b*1, and a base portion 10*a-b*21 and a base portion 10*a-b*22 connected to the bent portion 10*a-b*1 and extending in the column direction (±Y direction) from the bent portion 10*a-b*1. The base portion 10*a-b*21 and the base portion 10*a-b*22 are respectively electrically connected to respective upper surfaces of the contacts 1*a*-2(G) and 1*a*-4(G) by contacting them, and the bent portion 10*a-b*1 is separated from the contact 1*a*-3(S).

Figure 15:
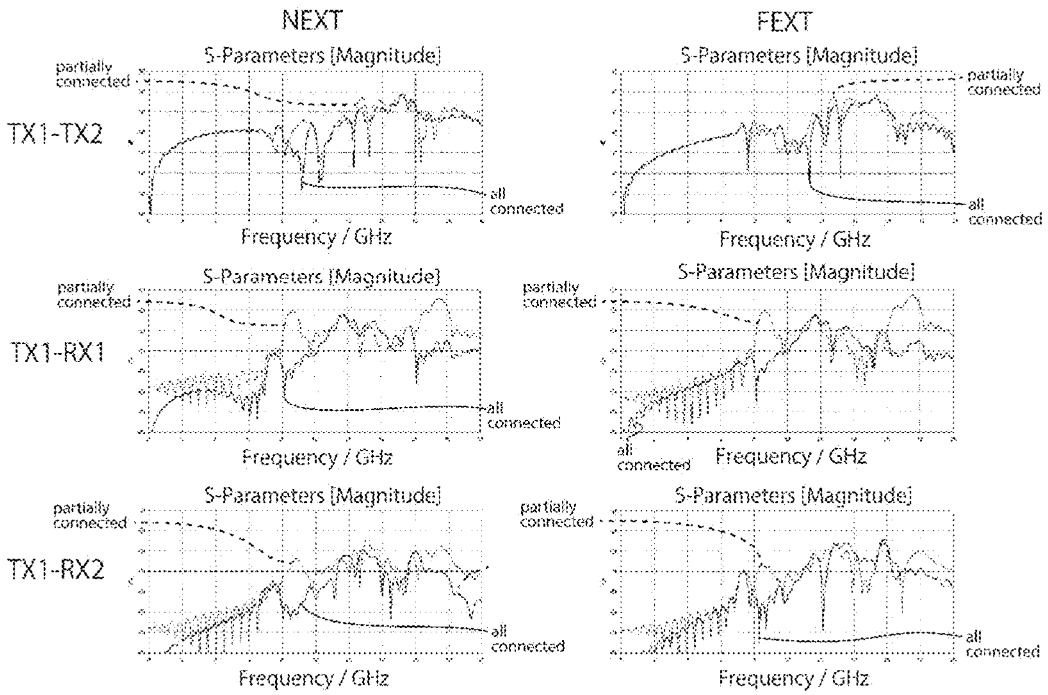
FIG. 15 is a graph showing an example of a simulation result for obtaining the difference in crosstalk for each of the configuration examples shown in FIG. 3 and FIG. 14.

However, as can be seen from the simulation result shown in the graphs in FIG. 15, the noise value due to crosstalk is generally lower when all the GNDs are connected than when only a part of the GNDs are connected, and especially a remarkable difference is seen in the frequency band of about 8 GHz or more. From this, it can be judged that it has good characteristics.

5) The Number of Pairs of the Metal Members

Figure 16:
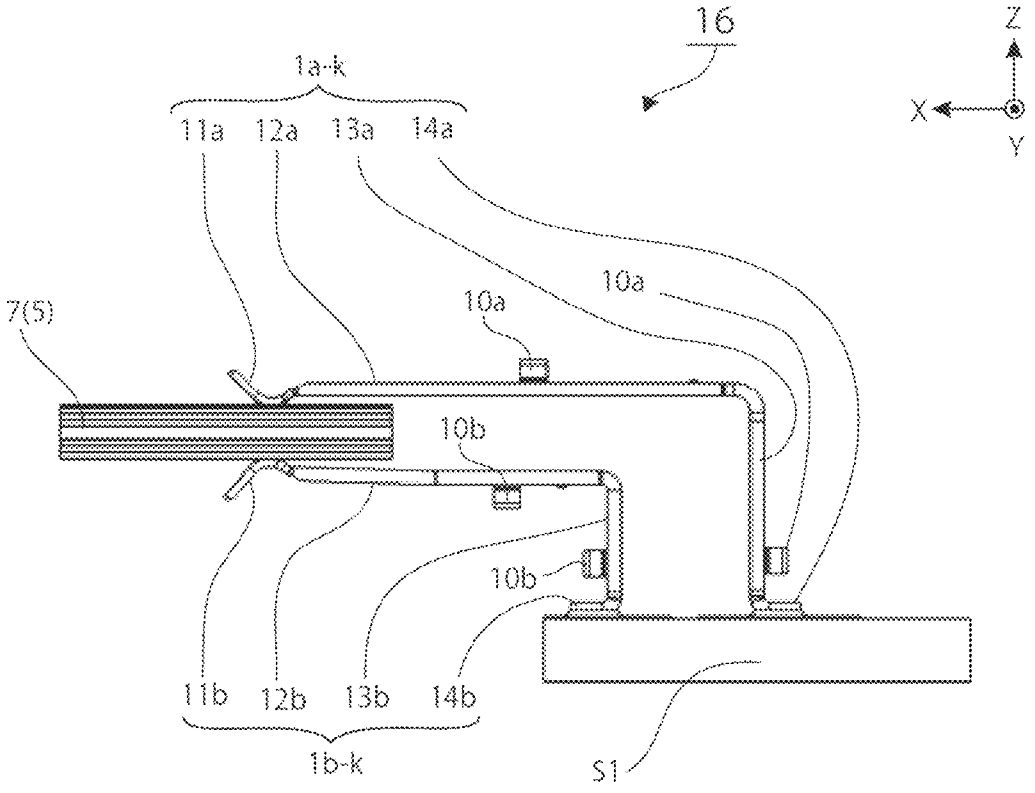
FIG. 16 is a diagram showing an example of a connector provided with a plurality of pairs of metal members.

The number of pairs of the metal members 10*a*, 10*b* is not limited to one pair as shown in FIG. 4, and a plurality of pairs may be provided as shown in FIG. 16, for example. However, although it is not shown in particular, it is known that the difference between the two is small when crosstalk is simulated, and from the viewpoint of manufacturing cost, etc., it can be said that the number of pairs of the metal members 10*a*, 10*b* is preferably one pair.

6) The Heights of the Bent Portions of the Metal Members

Figures 17, 18:
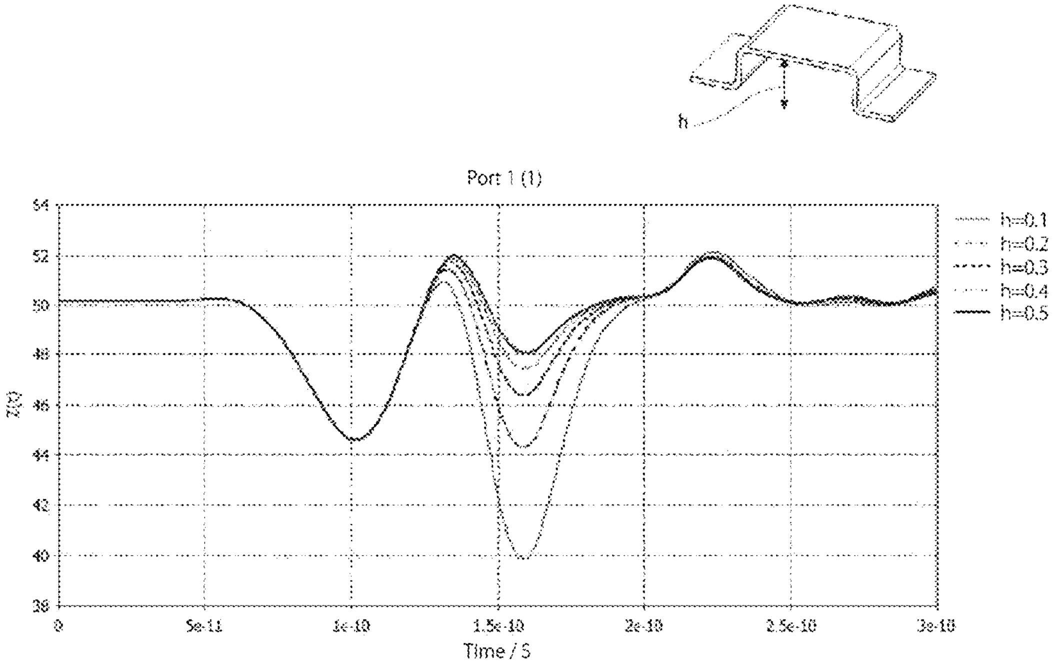
FIG. 17 is a diagram showing an example of a simulation result of impedance characteristics when the height of each bent portion of the metal member is changed.
FIG. 18 is a diagram showing an example of PIN arrays of a connector according to a second embodiment of the present disclosure.

In FIG. 17, an example of the simulation result of impedance characteristics in the case where the height (distance from the opposing contact surfaces) h of each bent portion in the metal members 10*a*, 10*b* is changed between 0.1 mm and 0.5 mm. As shown in FIG. 17, the value of impedance is lowered too much when the metal member is very close to the contact, such as h=0.1 mm, but it is shown that the difference in the impedance characteristics is small when the height h of the bent portion is between 0.2 mm and 0.5 mm, and it is known that an arbitrary value can be selected between this numerical value range.

(2) Second Embodiment

In the above-mentioned first embodiment, cases where the metal members 10*a*, 10*b* are applied to a single-ended transmission type connector are taken and explained, but the above-mentioned metal members are not limited to this, and crosstalk can be further reduced even when they are applied to a differential transmission type (Deferential Signaling type) connector. Hereinafter, an application example for a differential transmission type is explained below while referring to the drawings.

The detailed configuration including the shape, size of the housing, the slot into which the optical transceiver 15 of the communication partner is fitted, and the contacts 1*a-k* (k=1 to 11) and the contacts 1*b-k*(k=1 to 11) in the connector for high-speed transmission 16 according to the present embodiment are substantially the same as the connector for high-speed transmission 6 of the first embodiment, so the detailed explanation is omitted, and the differences from the first embodiment are mainly explained in the following.

Since the connector for high-speed transmission 16 is a differential transmission type, the PIN arrangement of the optical transceiver 15 in the slot is different from the above-mentioned first embodiment. As shown in FIG. 18, in the present embodiment, the first to the eleventh PIN arrays on the upper side and the lower side are arranged as follows.

In the case of the upper side, a ground GND is assigned to each of the first PIN at the left end, the fourth to eighth PIN columns from the left end and the PIN column at the right end. A reception signal RX1-*n* is assigned to the second PIN which is number two from the left end, a reception signal RX1-*p* is assigned to the third PIN which is number three from the left end, a transmission signal TX1-*n* is assigned to the ninth PIN which is number nine from the left end, and a transmission signal TX1-*p* is assigned to the tenth PIN which is number ten from the left end.

Similarly, regarding the lower side, a ground GND is assigned to each of the first PIN at the left end, the fourth to eighth PIN columns from the left end and the PIN column at the right end. A reception signal RX2-*n* is assigned to the second PIN which is number two from the left end, a reception signal RX2-*p* is assigned to the third PIN which is number three from the left end, a transmission signal TX2-*n* is assigned to the ninth PIN which is number nine from the left end, and a transmission signal TX2-*p* is assigned to the tenth PIN which is number ten from the left end.

Figure 19:
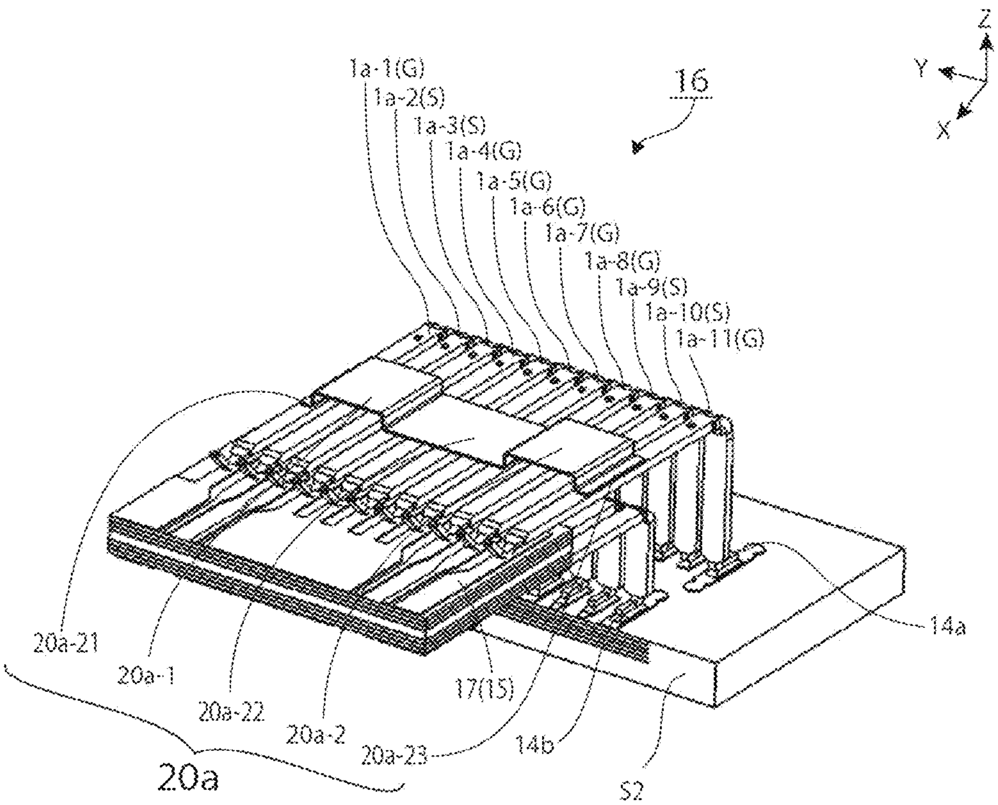
FIG. 19 is an example of a perspective view showing a schematic configuration of contacts and an upper metal member with a housing omitted from the connector according to the second embodiment.

Corresponding to the above-mentioned PIN array, the shape in the metal member is also different from the shape in the first embodiment. That is, as shown in FIG. 19, the metal member 20*a* provided in the connector for high-speed transmission 16 of the present embodiment has base portions 20*a*-21 to 20*a*-23 and bent portions 20*a*-1 and 20*a*-2, and is arranged on the left and right (Y direction) above respective linear portions 12*a* of the column of contacts 1*a*-*k*. The base portions 20*a*-21 to 20*a*-23 are in contact with and electrically connected to the contacts 1*a*-*k* connected to the ground GNDs from the upper surfaces among the first to the eleventh PIN columns, and the bent portions 20*a*-1 and 20*a*-2*a* are respectively bent upward so as to form a shape in which a U-shape is inverted upside down to avoid the contacts 1*a*-*k* other than the contacts 1*a*-*k* connected to the ground GNDs. The base portions 20*a*-21, 20*a*-22 are connected to the bent portion 20*a*-1 and extend in the column direction (±Y direction) from the bent portion 20*a*-1, the base portion 20*a*-22 is also connected to the bent portion 20*a*-2, and the base portion 20*a*-23 is connected to the bent portion 20*a*-2 and extends in the column direction (−Y direction).

More specifically, as shown in FIG. 19, the metal member 20*a* is in contact with the contacts 1*a*-1(G), 1*a*-4(G) to 1*a*-8(G) and 1*a*-11(G) from the respective upper surfaces to electrically connect them by the base portions 20*a*-21 to 20*a*-23. On the other hand, the bent portion 20*a*-1 is separated upward from the contacts 1*a*-2(S), 1*a*-3(S), and the bent portion 20*a*-2 is separated upward from the contacts 1*a*-9(S), 1*a*-10(S), thereby, contact is avoided so that these contacts are electrically disconnected. Further more specifically, the first bent portion 20*a*-1 is separated from the contacts 1*a*-2(S),1*a*-3(S) that transmit reception signals RX1-*n*,RX1-*p*, respectively, and the second bent portion 20*a*-2 is separated from the contacts 1*a*-9(S), 1*a*-10(S) that transmit the transmission signals TX1-*n*,TX1-*p*.

The material of the metal member 20*a* and the mounting method to the first to the eleventh PIN arrays are similar to the metal member 10*a* of the above-mentioned first embodiment.

Next, the metal member 20*b* mounted on the side of the contacts 1*b*-*k* (k=1 to 11) is explained.

Figure 20:
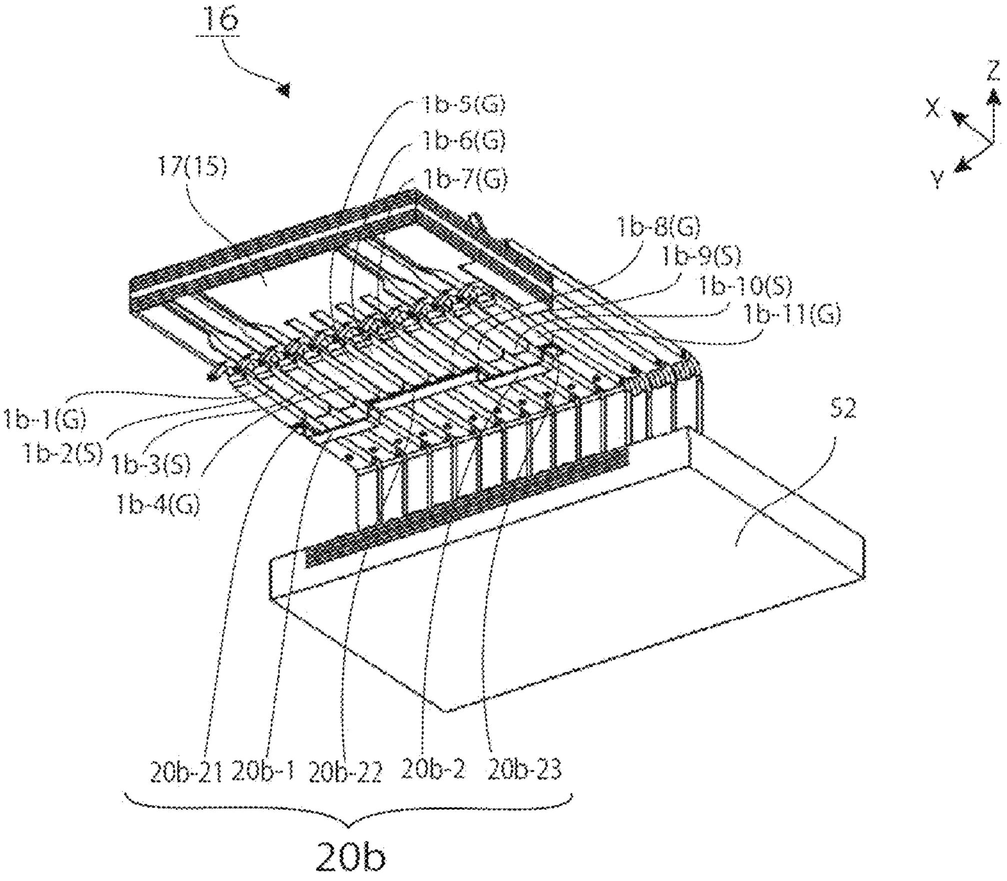
FIG. 20 is an example of a perspective view of the schematic configuration shown in FIG. 19 as viewed obliquely from below.

As shown in FIG. 20, the metal member 20*b* provided in the connector for high-speed transmission 16 of the present embodiment has base portions 20*b*-21,20*b*-22,20*b*-23 and bent portions 20*b*-1,20*b*-2, is arranged to extend to the left and right (±Y direction) on the lower surfaces of respective linear portions 12*b* of the column of contacts 1*b*-*k*, and is in contact with and electrically connected to the contacts 1*b*-*k* connected to the contacts for ground GNDs on the lower surfaces by the base portions 20*b*-21,20*b*-22,20*b*-23. The bent portions 20*b*-1,20*b*-2 are arranged to be separated from other contacts 1*b*-*k* excluding the contacts for ground GNDs so as to avoid these other contacts and bent downward in an approximately "U" shape. The base portions 20*b*-21, 20*b*-22 are connected to the bent portions 20*b*-1 and extend in the column direction (±Y direction). The base portions 20*b*-22 are also connected to the bent portion 20*b*-2 in the column direction (−Y direction), and the base portion 20*b*-23 is connected to the bent portion 20*b*-2 and extends in the column direction (−Y direction).

More specifically, the metal member 20*b* is in contact with the contacts 1*b*-1(G), 1*b*-4(G) to 1*b*-8(G) and 1*b*-11(G) on the respective lower surfaces of these contacts to electrically connect them by the base portions 20*b*-21,20*b*-22, 20*b*-23, the bent portion 20*b*-1 is arranged to be separated below from the contacts 1*b*-2(S), 1*b*-3(S), 1*b*-9(S) and 1*b*-10(S), thereby, mutual contact is avoided so that these contacts 1*b*-2(S),1*b*-3(S),1*b*-9(S) and 1*b*-10(S) are electrically disconnected. Further more specifically, the first bent portion 20*b*-1 is separated from the contacts 1*b*-2(S),1*b*-3(S) that transmit the reception signals RX2-*n*,RX2-*p*, respectively, and the second bent portion 20*b*-2 is separated from the contacts 1*b*-9(S),1*b*-10(S) that transmit the transmission signals TX2-*n*,TX2-*p*, respectively.

The material of the metal member 20*b* the mounting method to the first to the eleventh PIN arrays are also similar to the metal member 10*b* of the above-mentioned first embodiment.

It is to be noted that, since the connector for high-speed transmission 16 is a differential transmission type, both the optical transceiver 15 of the communication partner and the circuit board S2 to which the contacts 1*a*-*k* (k=1 to 11) and contacts 1*b*-*k* (k=1 to 11) are connected are different from those in the first embodiment. The header 17 of the optical transceiver 5 is fitted into the slot 40, the substrate side contact portions 14*a*, 14*b* of the contacts 1*a*-*k* (k=1 to 11) and the contacts 1*b*-*k* (k=1 to 11) are connected, for example, by welding to the contacts of the external circuit board S2 with corresponding wiring.

Hereinafter, the effect of crosstalk reduction by the metal members 20*a*, 20*b* in the present embodiment is described in details based on the simulation results.

Figure 21:
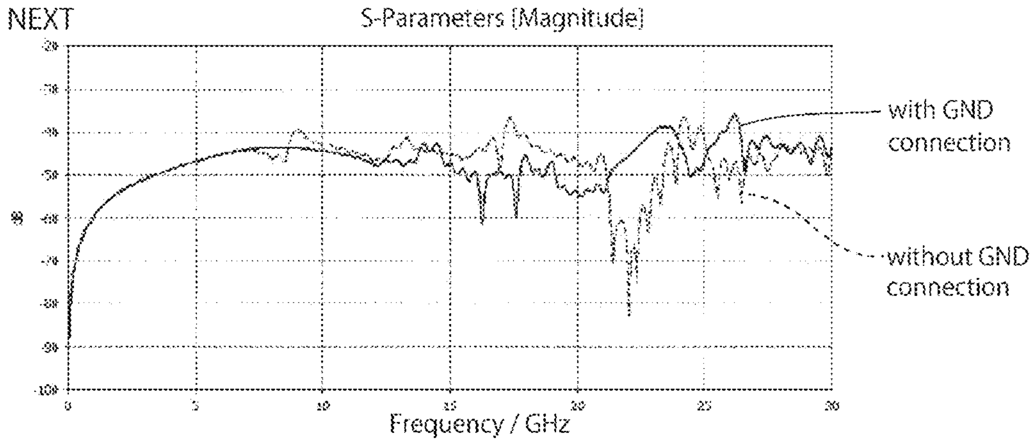
FIG. 21 shows graphs indicating an example of a simulation result on a crosstalk improvement effect by the metal members in the second embodiment.
Figure 21:
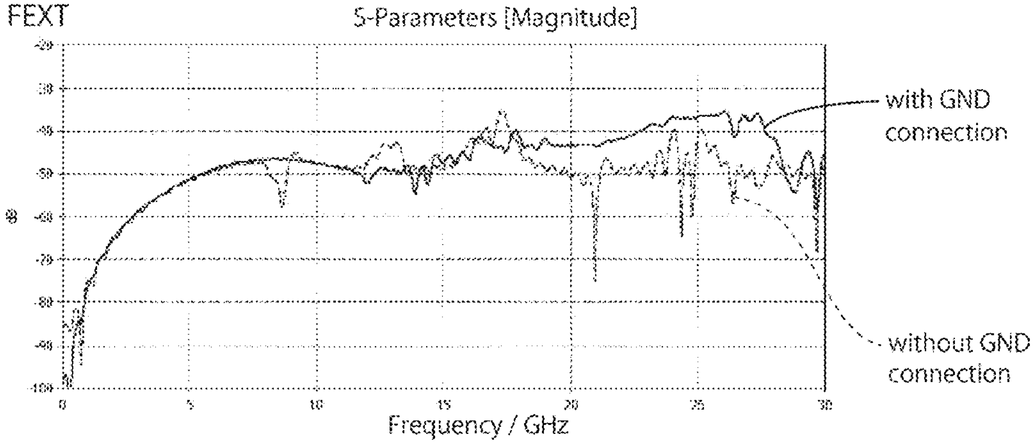

The graphs of FIG. 21 show an example of the simulation result on the improvement effect of crosstalk by the present embodiment where the metal members 20*a*, 20*b* are provided (with GND connection) compared to a conventional example where the metal members 20*a*, 20*b* are not provided (without GND connection). The same graphs are an example of the result of simulating the NEXT and the FEXT for the signal line (the TX1-*n* which is number nine and the TX1-*p* which is number ten from left) in the PIN array of the upper section and the signal line (the TX2-*n* which is number nine and the TX2-*p* which is number ten from left) in the PIN array of the lower section.

As shown in FIG. 21, since the TX1-*n* and TX1-*p* of the upper section and the TX2-*n* and TX2-*p* of the lower section are close to each other, similar to the above-mentioned first embodiment, there is no significant difference in crosstalk with or without GND connection regarding both the NEXT and the FEXT.

Figure 22:
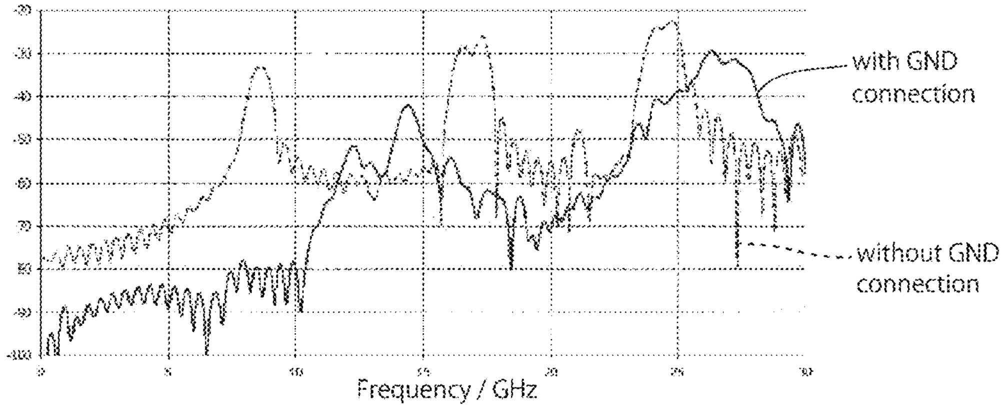
FIG. 22 shows graphs indicating another example of the simulation result on the crosstalk improvement effect by the metal members in the second embodiment.
Figure 22:
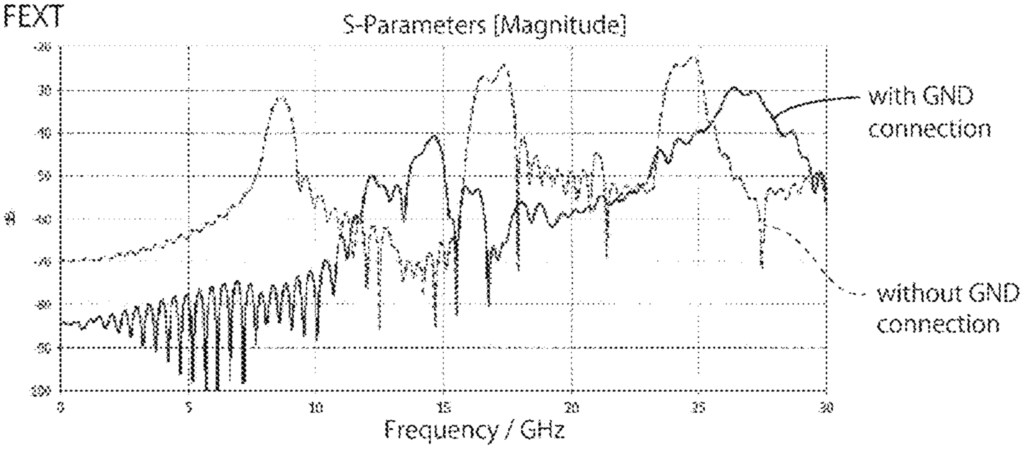

On the other hand, the graphs in FIG. 22, similarly, show another example of the simulation result on the improvement effect of crosstalk performed for the present embodiment in which the metal members 20*a*,20*b* are provided (with GND connection) compared to a conventional example in which the metal members 20*a*,20*b* are not provided (without GND connection), and are an example of the result of simulating the NEXT and the FEXT for the signal lines separated from each other in the PIN array of the upper section, that is, RX1-*n* which is number two and the RX1-*p* which is number three, and the TX1-*n* which is number nine and the TX1-*p* which is number ten from left.

Figure 23:
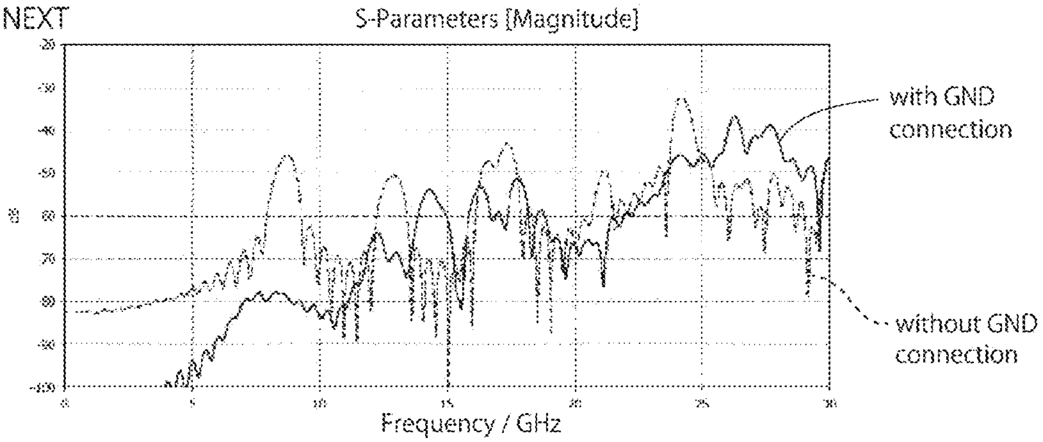
FIG. 23 shows graphs indicating yet another example of the simulation result on the crosstalk improvement effect by the metal members in the second embodiment.
Figure 23:
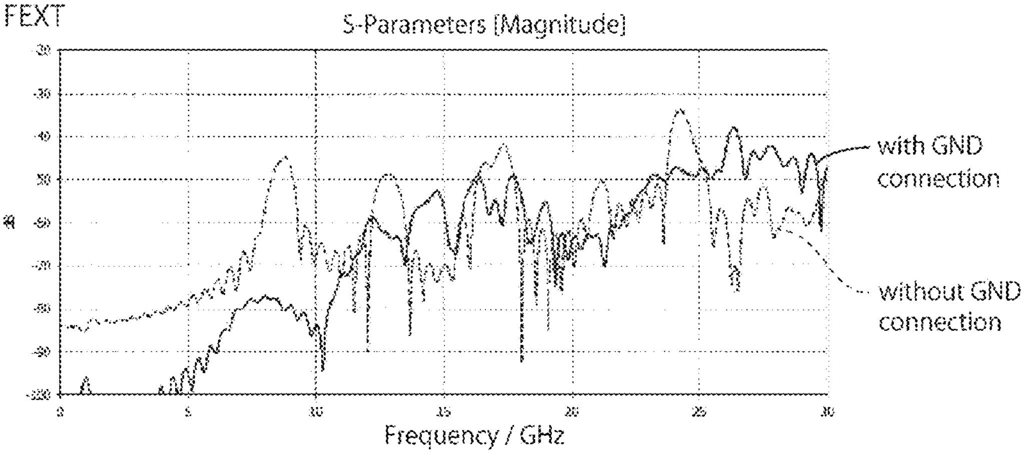

From FIG. 22, it has been found that regarding both the NEXT and the FEXT, merely except for the region of 12 to 15 GHz and the region of 25 GHz or more, the signal intensity in the case of "with GND connection" is significantly lower than that in the case of "without GND connection", and it can be seen that there is a significant improvement in crosstalk in the case of the present embodiment Similarly, the graphs in FIG. 23 also show another example of the simulation result comparing the present embodiment with GND connection to the conventional example without GND connection. But in the present example, it is an example of the result of simulating the NEXT and the FEXT for the signal lines separated from each other in the PIN arrays of the upper section and the lower section, that is, the TX1-*n* which is number nine and the TX1-*p* which is number ten from left in the upper section, and the RX2-*n* which is number two and the RX2-*p* which is number three from left in the lower section.

Similar to the case of FIG. 22, it has been found that a general improvement in crosstalk can be seen in the case of the present embodiment regarding both the NEXT and the FEXT.

Also in the second embodiment, the shapes and sizes, such as the widths, the thicknesses, the distance from each contact to the bent portion, and the arrangement positions, the number of pairs, the distinction between continuous/discontinuous, and the like of the metal members 20*a*,20*b* are substantially the same as the above-mentioned first embodiment. For this reason, detailed explanations are omitted.

Thus, the differential transmission type connector for high-speed transmission 16 of the present embodiment is also provided with the metal members 20*a*, 20*b* arranged on the upper side and the lower side of the contacts 1*a*-*k* (k=1 to 11) and the contacts 1*b*-*k* (k=1 to 11) and having bent portions bent to avoid contacts other than the contacts for ground while shorting the contacts for ground, so that the crosstalk can be further reduced with a simple configuration.

Modification Example

Although the embodiment of the present disclosure has been described above, the following modifications may be added to this embodiment.

In the above embodiment, an aspect in which the metal members 10*a*, 10*b*, or 20*a*, 20*b* are provided in pairs is described, but it is not limited to this, and crosstalk can be reduced even in the case where only one of them is provided without form a pair.

Further, a case where the number of the contacts 1*a*-*k* and 1*b*-*k* is eleven is taken up in the above embodiment, but it is not limited to this, and of course the present disclosure can be applied even in the case where there are ten or less or twelve or more.

Further, regarding the PIN array, an example in which four to five GND contacts are arranged between transmission and reception has been taken, but this number is not essential, and a smaller number of GND contacts may be arranged, and a larger number of GND contacts may be arranged.

Although the embodiments of the present disclosure have been described with reference to the accompanying drawings, these are provided for easy understanding of the disclosure, and the claims of the present disclosure are not limited thereby.

A person skilled in the art can implement the present disclosure by various modifications without departing from the scope and spirit of the present disclosure, for example, by incorporating the features of one Example into another Example, yet another Example can be obtained. A person skilled in the art can make various modifications, equivalent substitutions, or improvements in accordance with the spirit of the present disclosure without departing from the scope of the claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A connector for high-speed transmission, comprising:

a housing with an opening portion into which a communication partner is fitted;

a column of a plurality of contacts comprising at least one contact for ground; and a metal member separate from the plurality of contacts and disposed in the column of the plurality of contacts, shorting the at least one contact for ground and bent so as to avoid at least one of the plurality of contacts other than the at least one contact for ground, wherein each one of the plurality of contacts comprises a contact portion in contact with the communication partner, a first linear portion extending rearward from a rear end of the contact portion, a second linear portion bent and extending from a rear end of the first linear portion, and a terminal portion soldered to an external substrate at a tip end of the second linear portion, the metal member is disposed to extend across the column of the plurality of contacts, the metal member comprising a bent portion bent in a U-shape across the plurality of contacts other than the at least one contact for ground, and is connected to at least one of the first linear portion and the second linear portion of the at least one contact for ground.

2. The connector for high-speed transmission according to claim 1, wherein the metal member further comprises a base portion extending in a direction of the column of the plurality of contacts and connected to the bent portion at one end or both ends, the base portion is disposed on at least one of an upper surface and a lower surface of the first linear portions of the at least one contacts for ground.

3. The connector for high-speed transmission according to claim 1, wherein the column of the plurality of contacts further comprises a pair of contacts for high-speed signal transmission, a contact for low-speed signal and a contact for power supply, and the at least one contact for ground is arranged to be sandwiched between any of the pair of the contacts for high-speed signal transmission, the contact for low-speed signal and the contact for power supply.

4. The connector for high-speed transmission according to claim 3, wherein the bent portion of the metal member is located on an upper side or a lower side of the pair of contacts for high-speed signal transmission, the contact for low-speed signal, and the contact for power supply.

5. The connector for high-speed transmission according to claim 1, wherein the column of the plurality of contacts further comprises a pair of contacts for high-speed differential transmission, and the at least one contact for ground is disposed between the pair of contacts for high-speed differential transmission.

6. The connector for high-speed transmission according to claim 5, wherein the bent portion is located on an upper side or a lower side of the pair of contacts for high-speed differential transmission.

7. The connector for high-speed transmission according to claim 1, wherein:

the housing further comprises an upper plate portion and a lower plate portion opposed to each other with the opening portion sandwiched therebetween, the column of the plurality of contacts further comprises a first column of contacts supported by the upper plate portion and a second column of contacts supported by the lower plate portion, the metal member further comprises a first metal member disposed on an upper side of the first column of contacts and a second metal member disposed on a lower side of the second column of contacts, and the bent portion of the first metal member is bent upward, and the bent portion of the second metal member is bent downward.

8. The connector for high-speed transmission according to claim 7, wherein the first metal member is disposed over the first linear portion of the first column of contacts, the second metal member is disposed below the first linear portion of the second column of contacts, the first and the second metal members are disposed so as to be opposed to each other via the first linear portion of the first column of contacts and the first linear portion of the second column of contacts.

* * * * *